United States Patent
Sato et al.

(10) Patent No.: US 10,991,471 B2
(45) Date of Patent: Apr. 27, 2021

(54) EMERGENCY CORE COOLING SYSTEM AND BOILING WATER REACTOR PLANT USING THE SAME

(71) Applicants: Kabushiki Kaisha Toshiba, Minato-ku (JP); Toshiba Energy Systems & Solutions Corporation, Kawasaki (JP)

(72) Inventors: Takashi Sato, Yokohama (JP); Keiji Matsumoto, Yokohama (JP); Yoshihiro Kojima, Yokohama (JP); Yuji Komori, Yokohama (JP); Go Tanaka, Ota (JP)

(73) Assignees: Kabushiki Kaisha Toshiba, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 473 days.

(21) Appl. No.: 15/897,758

(22) Filed: Feb. 15, 2018

(65) Prior Publication Data

US 2018/0240558 A1  Aug. 23, 2018

(30) Foreign Application Priority Data

Feb. 21, 2017  (JP) .............................. JP2017-029944

(51) Int. Cl.
| | |
|---|---|
| G21C 15/18 | (2006.01) |
| G21D 1/02 | (2006.01) |
| G21D 3/04 | (2006.01) |
| G21C 13/02 | (2006.01) |

(52) U.S. Cl.
CPC ............. *G21C 15/18* (2013.01); *G21C 13/02* (2013.01); *G21C 15/182* (2013.01); *G21D 1/02* (2013.01); *G21D 3/04* (2013.01); *Y02E 30/30* (2013.01)

(58) Field of Classification Search
CPC ...... G21C 15/18; G21C 15/182; G21C 15/12; G21C 13/02; G21C 9/004; G21C 9/012
See application file for complete search history.

(56) References Cited

U.S. PATENT DOCUMENTS

| | | | |
|---|---|---|---|
| 5,426,681 A | * | 6/1995 | Aburomia .............. G21C 9/004 376/283 |
| 7,835,482 B2 | | 11/2010 | Sato et al. |
| 9,031,183 B2 | | 5/2015 | Sato |

(Continued)

FOREIGN PATENT DOCUMENTS

| | | |
|---|---|---|
| JP | 11-30685 A | 2/1999 |
| JP | 2005-201742 | 7/2005 |

(Continued)

*Primary Examiner* — Sharon M Davis
(74) *Attorney, Agent, or Firm* — Oblon, McClelland, Maier & Neustadt, L.L.P.

(57) ABSTRACT

According to an embodiment, an emergency core cooling system has: three active safety divisions each including only one motor-driven active safety system; one passive safety division including a passive safety system; an emergency power source disposed in each of the active safety divisions to supply electric power to the motor-driven active safety system; and an advanced passive containment cooling system disposed in the passive safety division. Only two active safety divisions each includes a low pressure flooder system that is commonly used with a residual heat removal system as the only one motor-driven active safety system. The other active safety division includes an air-cooled injection system as the only one motor-driven active safety system.

10 Claims, 18 Drawing Sheets

(56) References Cited

U.S. PATENT DOCUMENTS

| | | | |
|---|---|---|---|
| 9,697,914 B2 | 7/2017 | Sato et al. | |
| 10,290,379 B2* | 5/2019 | Sato | ........................ G21C 15/18 |
| 2008/0317193 A1* | 12/2008 | Sato | ........................ G21C 15/18 |
| | | | 376/282 |
| 2013/0235966 A1* | 9/2013 | Sato | ......................... G21D 3/06 |
| | | | 376/282 |
| 2013/0259184 A1* | 10/2013 | Sato | ........................ G21C 9/008 |
| | | | 376/293 |
| 2017/0162281 A1 | 6/2017 | Sato et al. | |

FOREIGN PATENT DOCUMENTS

| | | |
|---|---|---|
| JP | 2008-281426 | 11/2008 |
| JP | 2012-107926 | 6/2012 |
| JP | 2012-117821 | 6/2012 |
| JP | 2014-10080 | 1/2014 |
| JP | 2014-81219 A | 5/2014 |
| JP | 2016-14640 | 1/2016 |
| WO | WO 2016/002224 A1 | 1/2016 |

* cited by examiner

EMERGENCY CORE COOLING SYSTEM AND BOILING WATER REACTOR PLANT USING THE SAME

CROSS-REFERENCE TO RELATED APPLICATION

This application is based upon and claims the benefit of priority from Japanese Patent Application No. 2017-029944, filed on Feb. 21, 2017; the entire content of which is incorporated herein by reference.

FIELD

The embodiments of the present invention relate to an emergency core cooling system (ECCS) of a boiling water reactor (BWR) plant.

BACKGROUND

In nuclear plant safety systems, a safety system which has both an active safety system and a passive safety system is called a hybrid safety system. Now an example of a safety system is explained referring to FIG. 12 (Refer also to Japanese Patent Application Publication 2008-281426 A). In this example, there are three active safety divisions each of which has at least one active safety system.

A safety division in general is a space area that is separated from other safety divisions by physical separation walls to prevent incidents in the other divisions from affecting the concerned safety division in case of an assumed accident such as a fire or a flooding in a nuclear plant. Such an accident is assumed to take place for safety design of the plant. A safety division which has one or more active safety systems only is called an active safety division, while a safety division which has at least one passive safety system is called a passive safety division.

<Explanation Relating to FIG. 12>

In FIG. 12, each of the active safety divisions has: a high pressure core flooder system (HPCF) 1, a low pressure flooder system (LPFL) 2 which is shared with a residual heat removal system (RHR) 3, and an emergency diesel generator (EDG) 4d. Each of the emergency diesel generators (EDGs) 4d is cooled by a reactor coolant water system (RCW) and a reactor sea water system (RSW). There are three residual heat removal systems 3. Each of the three residual heat removal systems 3 is also cooled by a reactor coolant water system (RCW) and a reactor sea water system (RSW). There is only one passive safety division, which has an isolation condenser (IC) 5 and a passive containment cooling system (PCCS) 12.

The high pressure core flooder system 1 is a high pressure water injection system which can inject water into the core at a high pressure (9 MPa, for example) that is sufficiently higher than a normal operational pressure in the reactor pressure vessel. The low pressure flooder system 2 is a low pressure water injection system which can inject water into the core only when the pressure in the reactor pressure vessel is lower than the normal operational pressure, at 2 MPa for example.

The high pressure core flooder system 1 and the low pressure flooder system 2 in each of the active safety divisions has a 100% or more capacity required to cool the core in a loss of coolant accident (LOCA) that is a design basis accident (DBA). Each of the residual heat removal systems 3 in the active safety systems has a 100% or more capacity required to cool the reactor containment vessel in a loss of coolant accident that is a design basis accident.

As a means for depressurization of the nuclear reactor, an automatic depressurization system (ADS) is also equipped, although it is not illustrated. The automatic depressurization system automatically opens a plurality of safety relief valves to depressurize the reactor at a small pipe break accident and so on. Conventional boiling water reactors are commonly equipped with an automatic depressurization system.

There are three active safety divisions and three residual heat removal systems 3. Therefore, even when a loss of coolant accident is assumed to occur by a break of an injection pipe of the high pressure core flooder system 1 in the first active safety division and a single failure in the emergency diesel generator 4d in the second active safety division is assumed, and the emergency diesel generator 4d in the third active safety division is assumed to be in an on-line maintenance, the core can be cooled by the low pressure flooder system 2 in the first active safety division, and at the same time, the reactor containment vessel is cooled by the residual heat removal systems 3 in the first safety division. Such a capability of ensuring safety when two safety functions are lost in the active safety divisions due to a single failure and an on-line maintenance is called an N–2 (N minus 2) capability.

In order to achieve the N–2 capability, in the example shown in FIG. 12, there are six active safety systems and three residual heat removal systems 3. By the way, capability where safety is ensured even when one of the active safety divisions fails to function due to a single failure is called an N–1 (N minus 1) capability.

Each of the residual heat removal systems 3 requires a reactor coolant water system (RCW) and a reactor sea water system (RSW) as disclosed in Japanese Patent Application Publication 2005-201742 A, which results in many devices including motor-driven pumps and pipes. Each of the reactor coolant water systems requires two motor-driven pumps, and each of the reactor sea water systems also requires two motor-driven pumps. Thus, in the example shown in FIG. 12, there are six motor-driven pumps for the emergency core cooling system, while there are twelve motor-driven pumps for the secondary system. However, even when the number of the residual heat removal systems 3 is increased to three, reliability of the total system cannot be enhanced in proportion to the number of the sub-systems due to common mode failures of similar active systems.

In addition, if all of the reactor coolant water systems and the reactor sea water systems are flooded by tsunami and fail to be activated as in the accident in Fukushima Daiichi Nuclear Power Plant, all the residual heat removal systems 3 of the primary system would fail to be activated.

In general, cooling of a pump itself by air using an air fin cooler (AFC) is also a well known technique. However, in a case where many pumps are to be cooled and the heat exchangers of the residual heat removal systems 3 are to be simultaneously cooled, it was necessary to cool them by water using the reactor coolant water systems and the reactor sea water systems.

Now a conventional passive containment cooling system is explained referring to FIGS. 13 to 16.

<Explanation Relating to FIG. 13>

FIG. 13 is an elevational cross-sectional view showing an example of a structure of a conventional passive containment cooling system. In FIG. 13, a core 101 is installed in a reactor pressure vessel (RPV) 102. The reactor pressure vessel 102 is contained in a containment vessel 30. The containment vessel 30 has a shape of a hollow cylinder (See also FIG. 14).

The space inside the containment vessel 30 is divided into a dry well 40 that contains the reactor pressure vessel 102, and a wet well 50. The dry well 40 and the wet well 50 constitute part of the containment vessel 30. A suppression pool 60 is formed in the wet well 50, and a wet well gas phase 70 is formed above the suppression pool 60 in the wet well 50. The outer walls of the dry well 40 and the wet well 50 are united into a hollow cylindrical outer wall of the containment vessel 30. The top part of the dry well 40 is shaped in a flat plate and is called a top slab 40a of the dry well 40.

Atmosphere in the containment vessel 30 for a boiling water reactor is replaced with nitrogen, so that oxygen concentration is limited at a low level there.

The containment vessel 30 may be, for example, a steel containment vessel, a reinforced concrete containment vessel (RCCV), a pre-stressed concrete containment vessel (PCCV) or a steel concrete complex containment vessel (SCCV). In an RCCV and a PCCV, the inner surface of the vessel is lined with a steel liner, although it is not illustrated. FIG. 13 shows an example of an RCCV. As shown in FIG. 14, the outer wall of the RCCV is in shape of a circular hollow cylinder. The design pressure of the RCCV used in an advanced boiling water reactor (ABWR) is 310 kPa in gauge pressure.

The reactor pressure vessel 102 is supported by a circular hollow cylindrical pedestal 91 via an RPV skirt 92 and an RPV support 93. The pedestal 91 may be made of steel, concrete or combination of them, for example. The space in the dry well 40, below the reactor pressure vessel 102 and surrounded by the cylindrical wall of the pedestal 91 is called a pedestal cavity 91a. In case of an RCCV of an advanced boiling water reactor, the cylindrical wall of the pedestal 91 forms a boundary dividing the wet well 50 and the dry well 40, and the space is specifically called a lower dry well 40b.

A containment vessel lid 110 is provided above the reactor pressure vessel 102.

The dry well 40 and the suppression pool 60 are connected by LOCA vent pipes 80. The number of the LOCA vent pipes 80 may be ten as shown in FIG. 14, for example, although only two of them are shown in FIG. 13. In case of an RCCV, the LOCA vent pipes 80 are placed within the cylindrical wall of the pedestal 91. Therefore, the cylindrical wall of the pedestal 91 is also called a vent wall. The vent wall is made of reinforced concrete with a thickness of about 1.7 m and has steel plates on the inner and outer surfaces. The LOCA vent pipes 80 and the pedestal 91 constitute part of the containment vessel 30.

A plurality of vacuum breaker valves 90 are provided in order to return the gas in the wet well gas phase 70 back to the dry well 40. The number of the vacuum breaker valves 90 may be eight for example, although only one vacuum breaker valve 90 is shown in FIG. 13. The vacuum breaker valves 90 may be installed on the roof of the wet well 50 as shown in FIG. 13. Alternatively, the vacuum breaker valves 90 may be disposed on the side wall of the wet well 50 or on the LOCA vent pipes 80. The vacuum breaker valves 90 open when the pressure in the wet well 50 rises higher than the pressure in the dry well 40 and the differential pressure becomes larger than a preset differential pressure. The preset differential pressure may be, for example, about 2 psi (about 13.79 kPa). The vacuum breaker valves 90 constitute part of the containment vessel 30.

A cooling water pool 13 of the passive containment cooling system 12 is provided outside of the containment vessel 30. Cooling water 14 is stored in the cooling water pool 13. The cooling water pool 13 may be of a tank type, as shown in FIG. 13, for example. Alternatively, the cooling water pool 13 may be of a pool type. In case of a pool-type cooling water pool, the top is covered with a lid.

An exhaust pipe 15 is provided to exhaust steam out of the gas phase region above the water surface of the cooling water pool 13 to the environment. Optionally, a screen (not illustrated) as an insect protection may be disposed at the exit of the exhaust pipe 15. The cooling water pool 13 is typically disposed above the containment vessel 30, but may be alternatively disposed beside the containment vessel 30.

A heat exchanger 16 is so arranged that at least part of the heat exchanger 16 is submerged in the cooling water 14 in the cooling water pool 13. Typically, a plurality of heat exchangers 16 are disposed, although only one heat exchanger 16 is shown in FIG. 13. The heat exchanger 16 includes an inlet plenum 17, an outlet plenum 18 and heat transfer tubes 19 (See FIG. 15). In the example shown in FIG. 13, only the heat transfer tubes are in the cooling water pool 13, and the inlet plenum 17 and the outlet plenum 18 (See FIG. 15) protrude out of the cooling water pool 13. Alternatively, the whole heat exchanger 16 including the inlet plenum 17 and the outlet plenum 18 may be submerged in the cooling water pool 13.

A dry well gas supply pipe 20 is connected to the inlet plenum 17 for supplying gas in the dry well 40 to the inlet plenum 17. An end of the dry well gas supply pipe 20 is connected to the dry well 40.

A condensate return pipe 21 and a gas vent pipe 22 are connected to the outlet plenum 18. An end of the condensate return pipe 21 is connected to inside of the containment vessel 30. The end of the condensate return pipe 21 is introduced into the LOCA vent pipe 80 in the example shown in FIG. 13. Alternatively, the end of the condensate return pipe 21 may be introduced into the dry well 40 or into the suppression pool 60. An end of the gas vent pipe 22 is introduced into the wet well 50, and the end is submerged in the suppression pool 60. The depth of the submerged end of the gas vent pipe 22 in the suppression pool 60 is set smaller than the depth of the top of the openings of the LOCA vent pipes 80 in the suppression pool 60.

<Explanation Relating to FIG. 15>

FIG. 15 is an elevational cross-sectional view of a heat exchanger of a passive containment cooling system of the prior art. Now, a structure of heat exchanger 16 of a passive containment cooling system 12 of the prior art is described referring to FIG. 15.

As shown in FIG. 15, the outlet plenum 18 is disposed below the inlet plenum 17. Many U-shaped heat transfer tubes 19 are connected to a tube plate 23. Straight parts of the heat transfer tubes 19 extend horizontally. In FIG. 15, only two heat transfer tubes are illustrated out of much more heat transfer tubes 19 for simplicity of illustration. The cooling water 14 (See FIG. 13) is filled outside of the heat transfer tubes 19. The inlets of the heat transfer tubes 19 are open to the inlet plenum 17. The outlets of the heat transfer tubes 19 are open to the outlet plenum 18.

The dry well gas supply pipe 20 is connected to the inlet plenum 17, through which mixture gas of nitrogen, hydrogen, steam and so on in the dry well 40 is supplied to the inlet plenum 17. The mixture gas is introduced into the heat transfer tubes 19. Then, the steam is condensed into condensate, which flows out to the outlet plenum 18 via the outlets of the heat transfer tubes 19, and then, accumulate in lower part of the outlet plenum 18.

The condensate return pipe 21 is connected to the lower part of the outlet plenum 18. The condensate in the outlet plenum 18 returns to inside of the containment vessel 30 by gravity via the condensate return pipe 21. The gas vent pipe 22 is connected to upper part of the outlet plenum 18. Non-condensable gases such as nitrogen and hydrogen that have not condensed in the heat transfer tubes 19 are exhausted from the heat transfer tubes 19 and accumulate in the upper part of the outlet plenum 18.

The end of the gas vent pipe 22 reaches the suppression pool 60. The non-condensable gases in the outlet plenum 18 flow through the gas vent pipe 22, push the pool water in the suppression pool 60 downward, and are vented in the pool water. Then, the non-condensable gases flow into the wet well gas phase 70. The venting of the non-condensable gases through the gas vent pipe 22 is conducted by the differential pressure passively when the pressure in the dry well 40 is higher than the pressure in the wet well gas phase 70. When the pool water in the suppression pool 60 is not boiling, the pressure in the dry well 40 is kept higher than the pressure in the wet well gas phase 70 due to the pressure of the steam generating in an accident in the dry well 40.

In the conventional passive containment cooling system 12, if the differential pressure between the dry well 40 and the wet well gas phase 70 is not kept, the non-condensable gases cannot be vented, and the function of the passive containment cooling system 12 will be lost. That is because the non-condensable gases stay in the heat transfer tubes 19 and the steam in the dry well 40 cannot be introduced through the dry well gas supply pipe 20. Therefore, in order for the conventional passive containment cooling system 12 to function, it is required that the pressure in the dry well 40 is maintained to be higher than the pressure in the wet well gas phase 70 and the non-condensable gases in the heat transfer tubes 19 are vented through the gas vent pipe 22.

The heat transfer tubes 19 are not limited to horizontal U-shaped type. In an alternative example, the heat transfer tubes 19 may be disposed with their straight tube parts extending vertically. The inlet plenum 17 is always positioned above the outlet plenum 18. Thus, the condensate condensed in the heat transfer tubes 19 is guided to the outlet plenum 18 by gravity. The horizontal-type heat exchanger 16 has an advantage in resistance to earthquake and in efficiency in utilizing the cooling water 14. The vertical-type heat exchanger has an advantage in drainage of the condensate.

<Explanation Relating to FIG. 16>

Now, operation of the conventional passive containment cooling system 12 in a loss of coolant accident is explained referring to FIG. 16. FIG. 16 is a graph showing an analytical result of the pressure in the containment vessel when a loss of coolant accident has occurred and water injection into the reactor by active safety system is continued while the conventional passive containment cooling system 12 is used for cooling the containment vessel. The depressurization valves (DPVs; not illustrated) are activated to supply more steam to the passive containment cooling system. Fundamental purpose of the depressurization valves is to forcefully make openings, through which the steam in the reactor pressure vessel is discharged to the dry well 40, in order to depressurize the reactor pressure vessel 102. The depressurization valves are installed in an ESBWR (Economic Simplified Boiling Water Reactor). The analyzed plant is an ABWR of 1,350 kWe class, and it is assumed that water is injected by only one low pressure flooder system in a loss of coolant accident.

The design pressure (1 Pd) of the containment vessel of the ABWR is 410 kPa (in absolute pressure). The pressure in the containment vessel must be below the design pressure (1 Pd) in a loss of coolant accident of a design basis accident. However, the pressure in the reactor pressure vessel reaches the design pressure (1 Pd) about 12 hours after the start of the accident, and continues to rise to reach a pressure (2 Pd) of two times of the design pressure about 30 hours after the start of the accident, as shown in FIG. 16. In FIG. 16, the containment vessel vent is activated at that time, and the containment vessel is depressurized. If the containment vessel vent is not activated, the containment vessel may break.

In this case, water injection into the reactor is conducted by the low pressure flooder system 2 of the active safety system, and cooling water 103 is supplied to the reactor pressure vessel 102, so that integrity of the core 101 is secured. The decay heat generated in the core 101 transfers to the cooling water 103, and enhances the temperature of the cooling water 103 (See FIG. 13). When cooling by the cooling water 103 is sufficiently conducted, the amount of the steam generated through the break opening 104 is suppressed and mainly high temperature water flows out from the break opening 104 as a break flow.

Steam is discharged from the depressurization valves, and is condensed by the passive containment cooling system 12. However, only small part of the decay heat is cooled by the passive containment cooling system 12. Most of the decay heat is transferred to the high temperature cooling water 103, and the cooling water 103 flows out through the break opening 104 to the dry well 40. The flown out water then flows into the suppression pool 60 through the LOCA vent pipes 80. Most of the decay heat is transferred to the pool water in the suppression pool 60 because the high temperature cooling water flows into the suppression pool 60. As described above, the pool water in the suppression pool 60 is used for cooling the core 101 in a recirculating mode by the low pressure flooder system 2 that is an active safety system. As a result, the pool water in the suppression pool 60 is heated up by the decay heat that has been transferred by the high temperature water, and starts boiling several hours after the start of the accident.

The pressure in the wet well 50 rises with time due to the saturated vapor pressure of the vapor generated in the wet well gas phase 70. In accordance with the pressure rise in the wet well 50, the pressure in the dry well 40 also rises. Because the depressurization valves are activated and high pressure steam is discharged to the dry well 40, the pressure in the dry well 40 is always kept higher than the pressure in the wet well 50. Therefore, the pressure in the dry well 40 rises in accordance with the pressure increase in the wet well 50. FIG. 16 shows the pressure in the dry well 40. Although the passive containment cooling system 12 functions, sufficient amount of steam corresponding to the decay heat is not supplied to the passive containment cooling system 12. Therefore, the pressure in the dry well 40 rises.

On the contrary, if the depressurization valves are not activated, the pressure in the wet well gas phase 70 becomes higher than the pressure in the dry well 40 which is depressurized by the passive containment cooling system 12. Then, the nitrogen in the wet well gas phase 70 returns to the dry well 40 via the vacuum breaker valves 90. This nitrogen is one that had originally existed in the dry well 40 during normal operation. Then, as a loss of coolant accident happens, it has been discharged to the wet well 50 via the LOCA vent pipes 80 with the steam in the blowdown phase and being confined in the wet well gas phase 70. As a result, the atmosphere in the dry well 40 has been mainly occupied by steam, and the steam has been efficiently drawn and condensed by the conventional passive containment cooling system 12.

However, when the nitrogen confined in the wet well gas phase 70 flows back into the dry well 40 via the vacuum breaker valves 90, the nitrogen is drawn to the heat exchanger 16 via the dry well gas supply pipe 20 with the steam in the dry well 40. The steam is cooled by the heat exchanger 16 and is condensed, while the nitrogen drawn into the heat exchanger 16 is not condensed and remains in the heat exchanger 16.

Once the heat exchanger 16 is filled with the nitrogen, the steam cannot be drawn into the heat exchanger 16. At this moment, the conventional passive containment cooling system 12 loses the steam condensation function. In this case, the passive containment cooling system 12 does not function at all. As a result, the pressure in the containment vessel 30 may rise more rapidly. The cooling function of the conventional passive containment cooling system 12 cannot be recovered as the venting of the nitrogen filling the heat exchanger 16 is limited. That is because the nitrogen filling the heat exchanger 16 cannot be vented to the wet well 50 via the gas vent pipe 22, since the pressure in the wet well gas phase 70 is higher than the pressure in the dry well 40 when the pool water in the suppression pool 60 is boiling.

Therefore, even if a conventional passive containment cooling system 12 is installed, when the emergency core cooling system is used which cools the core with an active safety system, the containment vessel 30 cannot be cooled, and the deterioration of reliability of the residual heat removal systems 3 due to common cause failures could not be compensated. As described above, the conventional passive containment cooling system 12, in which the gas vent pipes 22 are led to the wet well 50, cannot cool the containment vessel while water injection into the reactor by the active safety systems is conducted in a loss of coolant accident. In other words, the conventional passive containment cooling system 12 cannot be used as a system for removing heat in a loss of coolant accident in a nuclear reactor where active safety systems are used.

By the way, if the gravity-driven core cooling system (GDCS) of a passive safety system is used in a loss of coolant accident (in an ESBWR, for example), the flow rate of cooling water injected into the reactor in the circulation mode is the minimum flow rate required to remove the decay heat of the core. Therefore, the steam equivalent to all of the supplied cooling water (or the steam corresponding to the decay heat) flows out through the break opening and the depressurization valves. Thus, the steam equivalent to the decay heat is supplied to the passive containment cooling system, and containment vessel cooling can be conducted by the conventional passive containment cooling system.

<Explanation Relating to FIG. 17>

Now, the structure of the emergency core cooling system of an ABWR, which is a representative example of a conventional BWR with active safety systems is explained.

As shown in FIG. 17, the emergency core cooling system of a conventional ABWR has three active safety divisions. Each of the active safety divisions has: a low pressure flooder system (LPFL) 2 which is commonly used in a residual heat removal system (RHR) 3, and an emergency diesel generator (EDG) 4d which supplies power source for the active safety systems. The residual heat removal systems 3 are cooled by the reactor coolant water systems (RCWs) and the reactor sea water systems (RSWs). The emergency diesel generators (EDGs) 4d are also cooled by the reactor coolant water systems (RCWs) and the reactor sea water systems (RSWs). In addition, a reactor core isolation cooling system (RCIC) 11 is installed in the first safety division. The reactor core isolation cooling system 11 does not require an emergency diesel generator (EDG) 4d for operation because the reactor core isolation cooling system 11 is driven by its turbine using the steam in the reactor as a source of power. The reactor core isolation cooling system 11 does not require cooling by the reactor coolant water system, either. Therefore, the reactor core isolation cooling system 11 can cool the core even in a station blackout.

A reactor core isolation cooling system is installed also in previous BWRs than the ABWR. In the previous BWRs than the ABWR, the reactor core isolation cooling system is a non-safety system, and is installed in a non-safety division. The reactor core isolation cooling system can inject water into the reactor pressure vessel when the reactor is in high pressure (about 9 MPa, for example) to low pressure (about 1 MPa, for example). In the ABWR, the reactor core isolation cooling system has also a function of an emergency core cooling system. Therefore, the reactor core isolation cooling system is installed in the first safety division of the emergency core cooling system. In addition, a high pressure core flooder system (HPCF) 1 is installed in each of the second and third safety divisions.

Thus, the high pressure systems of the emergency core cooling system of the ABWR consists of three high pressure systems that includes one reactor core isolation cooling system 11 and two high pressure core flooder systems 1. The low pressure system also consists of three low pressure systems that are three low pressure flooder systems 2. The core can be kept flooded with those in a loss of coolant accident.

The loss of coolant accident as a design basis accident is a break of a pipe in the high pressure core flooder system 1 in the second safety division, for example. Even if a single failure of an emergency diesel generator (EDG) 4d in the third safety division is assumed in the case, water injection is started from a high pressure condition of the reactor pressure vessel 102 by the reactor core isolation cooling system 11 in the first safety division. After the reactor pressure vessel 102 is depressurized, water can be injected by the low pressure flooder system 2 in the first safety division and the low pressure flooder system 2 in the second safety division.

As explained above, the core 101 is kept flooded by initiating water injection into the reactor pressure vessel 102 by the reactor core isolation cooling system 11 from the high pressure condition of the reactor pressure vessel 102. If water injection by the reactor core isolation cooling system 11 was not conducted, start of water injection by the low pressure flooder system 2, which is activated after depressurization in the reactor pressure vessel 102, would be delayed, and upper portion of the core 101 would be uncovered partially. However, even in that case, it is so designed that maximum temperature of the fuel claddings would be well below 1,200 degrees Celsius (specifically, about 900 degrees Celsius, for example).

In addition, an automatic depressurization system (ADS) as a means for depressurizing the reactor is installed, although it is not illustrated. The automatic depressurization system automatically opens a plurality of safety relief valves in order to depressurize the reactor, when a small diameter pipe break accident etc. has occurred. The automatic depressurization system is installed commonly in conventional boiling water reactors.

<Explanation Relating to FIG. 18>

Now, a conventional air-cooled injection system (AIS) 6 is explained referring to FIG. 18. As shown in FIG. 18, a conventional air-cooled injection system 6 has a motor-driven pump 6a, a suction pipe 6c, an injection pipe 6b, an air fin cooler (AFC) 61, a circulation pump 65, and a circulation pipe 66. The structures of the motor-driven pump 6a, the suction pipe 6c, and the injection pipe 6b are the same as those of a conventional motor-driven active emergency core cooling system.

The air fin cooler 61 is an air-cooled heat exchanger, and has a tube bundle 62 of cooling tubes 62a and a fan 63. Cooling water flows in the cooling tubes 62a, and external air 68 driven by the fan 63 is blown to the tube bundle 62. Fins are attached to the cooling tubes 62a in order to enhance heat removal efficiency. The fan 63 is rotated by an electric motor 64. The tube bundle 62 is fixed and supported by a support structure 67. The cooling water cooled by the air fin cooler 61 flows in the circulation pipe 66 driven by the circulation pump 65. The cooling water flows in the motor-driven pump 6a and cools the motor-driven pump 6a, and then, is led to the tube bundle 62 of the air fin cooler 61 via the circulation pipe 66. The cooling water is cooled again there.

In a loss of coolant accident, the decay heat generated in the core 101 heats up the break flow, and the break flow heats up the pool water in the suppression pool 60 because the break flow goes to the suppression pool 60 via the LOCA vent pipes 80. Since the conventional air-cooled injection system 6 uses the high temperature pool water drawn from the suction pipe 6c as a water source, temperature inside of the motor-driven pump 6a is also raised. Therefore, mechanical seal part, which is a sliding part, needs to be cooled by cooling water from the air fin cooler 61. The motor-driven pumps of the ordinary emergency core cooling system are cooled by cooling water supplied from the reactor coolant water systems.

In case of the air-cooled injection system 6, the air fin cooler 61 is used instead of the reactor coolant water systems. The air fin cooler 61 has an advantage that a reactor sea water system is not required that is required in case of a reactor coolant water system, because the air fin cooler 61 discharges heat directly to the external air. Therefore, power source for the air-cooled injection system 6 is generally a gas turbine power generator that does not require cooling by the reactor coolant water system. In some cases, the power source for the air-cooled injection system 6 is an air-cooled diesel generator (air-cooled DG) that also does not require cooling by the reactor coolant water system. In such a case, the air-cooled DG is cooled by the air fin cooler 61. The air fin cooler 61 is usually installed on the roof of a building because the external air is taken in and exhausted. Alternatively, the air fin cooler 61 may be installed inside a building, with external air flow passages secured for taking in and for exhausting external air.

In a conventional hybrid safety system, a residual heat removal system is provided in each of the active safety divisions. However, there was a problem that each of the residual heat removal systems requires a reactor coolant water system and a reactor sea water system as secondary systems, so that it requires a lot of constituting devices such as motor-driven pumps and pipes, as disclosed in Japanese Patent Application Publication 2005-201742 A. That results in a lot of constituting devices depending on the number of the active safety divisions, in a case of conventional hybrid safety system with three or more active safety divisions.

Basically, it is preferable that the number of the active safety divisions is increased for improving safety. If a single failure is considered, at least two active safety divisions are required. However, if the number of the active safety divisions was increased to three or more, the number of the reactor coolant water systems and the number of the reactor sea water systems would increase, and the amount of the devices would increase, which would be a problem.

In addition, even if the number of residual heat removal systems is increased, total reliability is not improved much due to common mode failures of the same kind of active devices, which is another problem. Furthermore, the reactor sea water system is fragile against giant earthquakes and large tsunami. If the reactor sea water systems lose their function due to the giant earthquakes or large tsunami, the residual heat removal systems would also lose their function, which is yet another problem.

In the conventional passive containment cooling system, in a loss of coolant accident, the containment vessel cannot be cooled if the active emergency core cooling system is activated, and the limit of reliability of the residual heat removal systems due to the common cause failures cannot be compensated.

DETAILED DESCRIPTION

Figure 1:
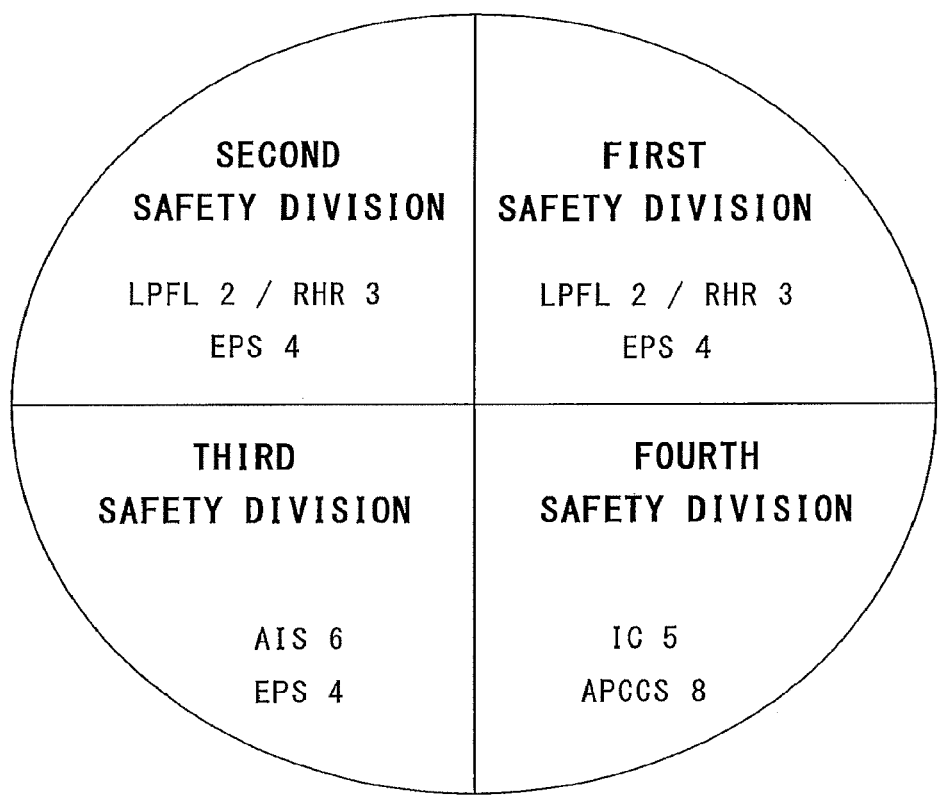
FIG. 1 is an explanatory drawing showing a total structure of a first embodiment of an emergency core cooling system according to the present invention.

An object of the embodiments of the present invention is to improve reliability of cooling the containment vessel in a loss of coolant accident in a nuclear plant with three or more active safety divisions while reducing the number of components of residual heat removal systems, the reactor coolant water systems and the reactor sea water systems.

According to an embodiment, there is presented an emergency core cooling system for a boiling water reactor plant, the plant including: a reactor pressure vessel containing a core a containment vessel having: a dry well containing the reactor pressure vessel, a wet well containing a suppression pool in a lower part thereof, and a wet well gas phase in an upper part thereof, a LOCA vent pipe connecting the dry well and the suppression pool, an outer well disposed outside of the dry well and the wet well, adjacent to the dry well via a dry well common wall, and adjacent to the wet well via a wet well common wall, and a scrubbing pool storing water, disposed in the outer well, the emergency core cooling system comprising: at least three active safety divisions each including only one motor-driven active safety system; at least one passive safety division each including a passive safety system that does not require any electric motors; an emergency power source disposed in each of the active safety divisions to supply electric power to the motor-driven active safety system; and an advanced passive containment cooling system disposed in the passive safety division including a gas vent pipe, leading end of the gas vent pipe being submerged in water in the scrubbing pool, the advanced passive containment cooling system being configured to be able to cool the containment vessel when a loss of coolant accident has occurred and the active safety systems are activated, wherein only two active safety divisions out of the at least three active safety divisions each includes a low pressure flooder system that is commonly used with a residual heat removal system as the only one motor-driven active safety system, the active safety divisions except for the only two active safety divisions, each of which includes the low pressure flooder system that is commonly used with the residual heat removal system, includes an air-cooled injection system as the only one motor-driven active safety system, and the advanced passive containment cooling system includes: a cooling water pool for storing cooling water, the cooling water pool being disposed outside the containment vessel; a heat exchanger including an inlet plenum, an outlet plenum and heat transfer tubes, at least part of the heat exchanger being submerged in the cooling water in the cooling water pool; a gas supply pipe connected to the inlet plenum of the heat exchanger at one end and to a gas phase part of the containment vessel at another end, the gas supply pipe being configured to guide gases in the containment vessel into the heat exchanger; a condensate return pipe connected to the outlet plenum of the heat exchanger at one end and to the containment vessel at another end, the condensate return pipe being configured to guide condensate in the heat exchanger into the containment vessel; and a gas vent pipe connected to the outlet plenum of the heat exchanger at one end and submerged in the scrubbing pool in the outer well at another end, the gas vent pipe being configured to vent non-condensable gases in the heat exchanger into the outer well.

According to another embodiment, there is presented a boiling water reactor plant comprising: a core; a reactor pressure vessel containing the core; a containment vessel having: a dry well containing the reactor pressure vessel, a wet well containing a suppression pool in a lower part thereof, and a wet well gas phase in an upper part thereof, a LOCA vent pipe connecting the dry well and the suppression pool, an outer well disposed outside of the dry well and the wet well, adjacent to the dry well via a dry well common wall, and adjacent to the wet well via a wet well common wall, and a scrubbing pool storing water, disposed in the outer well; and an emergency core cooling system including: at least three active safety divisions each including only one motor-driven active safety system; at least one passive safety division each including a passive safety system that does not require any electric motors; an emergency power source disposed in each of the active safety divisions to supply electric power to the motor-driven active safety system; and an advanced passive containment cooling system disposed in the passive safety division including a gas vent pipe, leading end of the gas vent pipe being submerged in water in the scrubbing pool, the advanced passive containment cooling system being configured to be able to cool the containment vessel when a loss of coolant accident has occurred and the active safety systems are activated, wherein only two active safety divisions out of the at least three active safety divisions each includes a low pressure flooder system that is commonly used with a residual heat removal system as the only one motor-driven active safety system, the active safety divisions except for the only two active safety divisions, each of which includes the low pressure flooder system that is commonly used with the residual heat removal system, each includes an air-cooled injection system as the only one motor-driven active safety system, and the advanced passive containment cooling system includes: a cooling water pool for storing cooling water, the cooling water pool being disposed outside the containment vessel; a heat exchanger including an inlet plenum, an outlet plenum and heat transfer tubes, at least part of the heat exchanger being submerged in the cooling water in the cooling water pool; a gas supply pipe connected to the inlet plenum of the heat exchanger at one end and to a gas phase part of the containment vessel at another end, the gas supply pipe being configured to guide gases in the containment vessel into the heat exchanger; a condensate return pipe connected to the outlet plenum of the heat exchanger at one end and to the containment vessel at another end, the condensate return pipe being configured to guide condensate in the heat exchanger into the containment vessel; and a gas vent pipe connected to the outlet plenum of the heat exchanger at one end and submerged in the scrubbing pool in the outer well at another end, the gas vent pipe being configured to vent non-condensable gas in the heat exchanger into the outer well.

According to yet another embodiment, there is presented a boiling water reactor plant comprising: a core; a reactor pressure vessel containing the core; a containment vessel; and an emergency core cooling system configured to be able to cool at least one of the containment vessel or the core, wherein the emergency core cooling system includes: at least three active safety divisions each including only one motor-driven active safety system, and at least one passive safety division each including a passive safety system that does not require any electric motors, only two of the at least three active safety divisions each includes a low pressure flooder system as the only one motor-driven active safety system, the active safety divisions except for the only two active safety divisions, each of which includes the low pressure flooder system each includes an air-cooled injection system as the only one motor-driven active safety system, and the at least one passive safety division each includes an advanced passive containment cooling system that is configured to be able to cool the containment vessel when the active safety system is activated.

Specific embodiments of the present invention are now described referring to FIGS. 1 to 11.

In those drawings, same or similar parts of those in FIGS. 12 to 18 are represented by the same reference numerals, and some repetitive explanation will be omitted.

First Embodiment

Now, a first embodiment is explained referring to FIGS. 1 to 4.

<Explanation Relating to FIG. 1>

FIG. 1 is an explanatory drawing showing a total structure of a first embodiment of an emergency core cooling system according to the present invention. The emergency core cooling system (ECCS) of the present embodiment is constituted by first to fourth safety divisions. The first to third safety divisions are active safety divisions. The fourth safety division is a passive safety division which has a passive emergency core cooling system. In each of the first and second active safety divisions, a low pressure flooder system (LPFL) 2 as only one motor-driven low pressure core cooling system, a residual heat removal system (RHR) 3 as a residual heat removal system which commonly uses part of pumps and pipes with the low pressure flooder system 2, and an emergency power source (EPS) 4 which supplies electric power to the low pressure flooder system 2 and the residual heat removal system 3. Since part of the low pressure flooder system 2 and the residual heat removal system 3 share some pumps and part of the pipes, it is shown as "LPFL 2/RHR 3" in FIG. 1.

In addition, an automatic depressurization system (ADS) is installed as means for depressurization of the reactor, although it is not illustrated. The automatic depressurization system is a system for automatically opening a plurality of safety relief valves in a case of a small diameter pipe break accident and so as to depressurize the reactor. The automatic depressurization system is commonly installed also in a conventional boiling water reactor.

Each of the low pressure flooder systems 2 has a 100% water injection capacity required to cool the core at least in a loss of coolant accident (LOCA) of a design basis accident (DBA). That is, the low pressure flooder system 2 can cool the core safely in a loss of coolant accident of a design basis accident under the specified operation pressure (less than 2 MPa, for example) with only one system in operation.

The heat removal capacity of the residual heat removal system 3 is at least 100% heat removal rate required to cool the core and the containment vessel in a design basis accident with only one system in operation. That means that a residual heat removal system 3 in at least one active safety system division has to be operated in order to secure 100% heat removal capacity required to cool the core and the containment vessel in a design basis accident.

An air-cooled injection system (AIS) 6 and an emergency power source 4 for supplying electric power to the air-cooled injection system 6 are installed in the third active safety division, as only one motor-driven emergency core cooling system. The motor-driven pump 6*a* in the air-cooled injection system 6 is cooled by an air fin cooler 61 (See FIG. 18). The air-cooled injection system 6 has at least 100% injection flow rate required in a loss of coolant accident of a design basis accident, for example.

The emergency power source 4 may have a 2×50% capacity instead of 1×100% capacity. That is, the emergency power source 4 may include two small size emergency power source units.

The low pressure flooder system 2 may be replaced by other types of motor-driven low pressure emergency core cooling systems.

In addition, in the fourth safety division, where a passive emergency core cooling system is installed, an isolation condenser (IC) 5 and an advanced passive containment cooling system (APCCS) 8 are installed. The isolation condenser 5 and the advanced passive containment cooling system 8 have a common cooling water source, which stores a large amount of water (5000 m³, for example) sufficient for removing decay heat for seven days, for example.

In the first embodiment, the emergency power sources 4 may be emergency diesel power generators (EDGs), gas turbine power generators (GTGs) (See FIG. 6), or air-cooled diesel generators (air-cooled DGs). The air-cooled injection system 6 may be of the same type as the conventional air-cooled injection system 6 explained above referring to FIG. 18, or may be a low-pressure air-cooled injection system (LAIS) (See FIG. 5, etc.) or of a high-pressure air-cooled injection system (HATS) (See FIG. 6, etc.).

Figure 2:
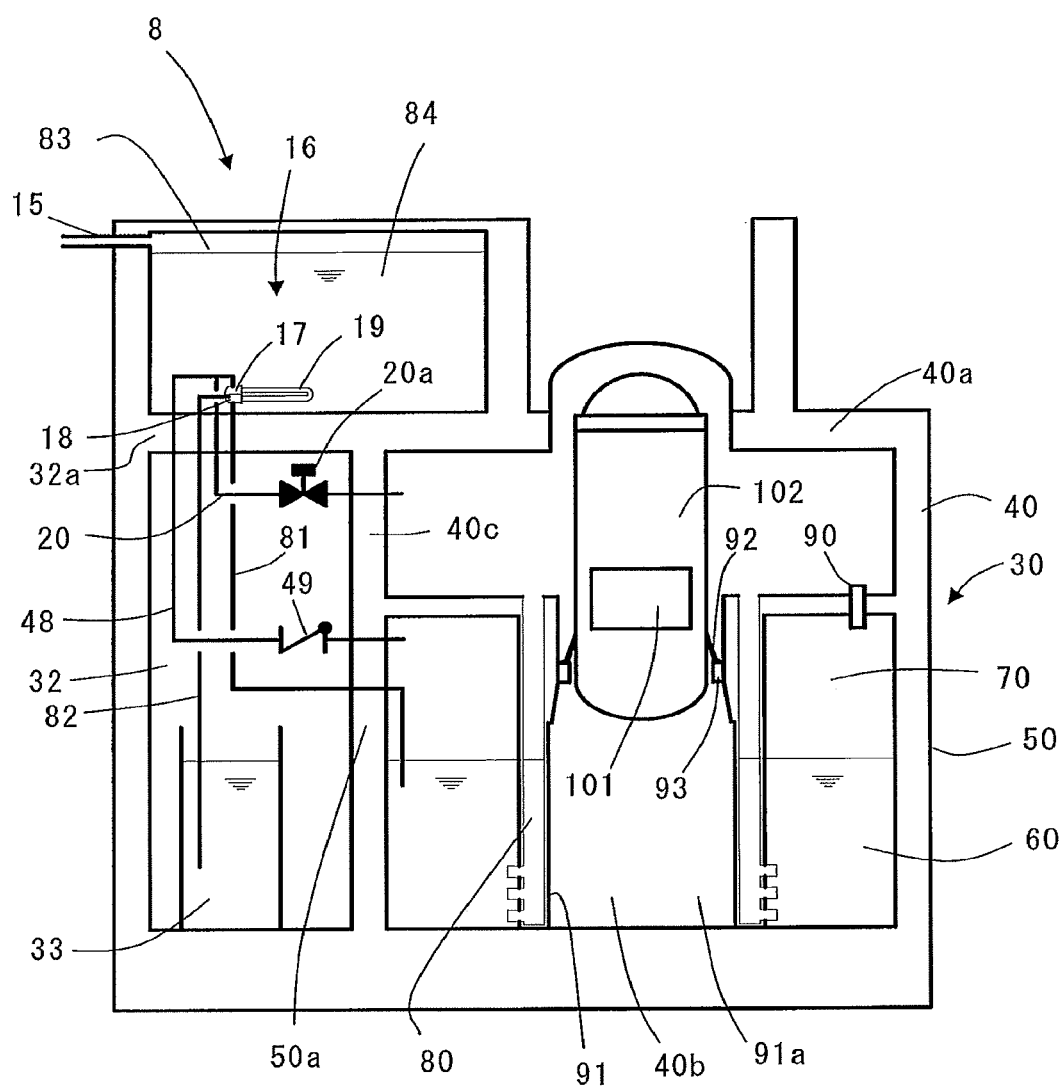
FIG. 2 is an explanatory drawing showing a total structure of an example of an advanced containment cooling system of an emergency core cooling system according to the present invention.

<Explanation Relating to FIG. 2>

Now, an advanced passive containment cooling system (APCCS) 8 which is used in the first embodiment is described referring to FIG. 2.

The containment vessel 30 is constituted with a drywell 40, a wet well 50, and an outer well 32. The outer walls of the dry well 40 and the wet well 50 are integrated in a single hollow cylindrical wall. The atmosphere inside the dry well 40 and the wet well 50 is replaced with nitrogen. The dry well 40 and the wet well 50 constitute part of the containment vessel, and have pressure resistance and gas tightness. The outer well 32 is disposed outside of the dry well 40 and the wet well 50. The outer well 32 is disposed adjacent to the dry well 40 via a dry well common wall 40*c*, and adjacent to the wet well 50 via a wet well common wall 50*a*. The top of the outer well 32 is in a flat plate shape and is called a top slab 32*a*. The atmosphere in the outer well 32 is replaced with nitrogen. The outer well 32 constitutes part of the containment vessel 30, and has pressure resistance and gas tightness. The design pressure of the containment vessel 30 including the outer well 32 is, for example, 310 kPa (gauge pressure). In the example shown in FIG. 2, the outer well 32 is disposed on one side of the dry well 40 and the wet well 50. Alternatively, a circular cylindrical outer well 32 may cover all over the dry well 40 and the wet well 50 which are circular cylindrical. Such an example is disclosed in Japanese Patent Application Publication 2012-117821 A.

The containment vessel 30 may be, for example, a steel containment vessel, a reinforced concrete containment vessel (RCCV), a pre-stressed concrete containment vessel (PCCV) or a steel concrete complex containment vessel (SCCV). In an RCCV and a PCCV, the inner surface of the vessel is lined with a steel liner. FIG. 2 shows an example of an SCCV.

The heat exchanger 16 of the advanced passive containment cooling system (APCCS) 8 is installed submerged in the pool water 84 of the APCCS pool 83. The APCCS pool 83 is disposed outside of the containment vessel 30. One end of the gas vent pipe 82 is connected to the upper part of the outlet plenum 18 of the heat exchanger 16, and the other end of the gas vent pipe 82 is submerged in the water in a scrubbing pool 33 which is disposed in the outer well 32. The gas vent pipe 82 extends in the outer well 32. One end of the dry well gas supply pipe 20 is opened in the dry well 40, and the other end of the dry well gas supply pipe 20 is connected to the inlet plenum 17 of the heat exchanger 16. The dry well gas supply pipe 20 extends in the outer well 32. The dry well gas supply pipe 20 guides gases in the dry well 40 into the inlet plenum 17 of the heat exchanger 16.

In the present embodiment, an isolation valve 20*a* is installed on the dry well gas supply pipe 20. In the case shown in FIG. 2, the isolation valve 20*a* is closed during a normal operation. In this case, the isolation valve 20*a* is opened by a signal in an accident. The signal may be a manual open signal or an accident open signal. The accident open signal may be triggered by a high dry well pressure signal or a high dry well temperature signal. The isolation valve 20*a* is optional and may be omitted.

One end (first end) of the wet well gas supply pipe (gas supply pipe) 48 is opened in a wet well gas phase 70, and the other end (second end) of the wet well gas supply pipe 48 is connected to the dry well gas supply pipe 20 between the isolation valve 20*a* and the inlet plenum 17. Alternatively, the second end of the wet well gas supply pipe 48 may be directly connected to the inlet plenum 17 of the heat exchanger 16. The wet well gas supply pipe 48 extends in the outer well 32. The wet well gas supply pipe 48 guides gases in the wet well gas phase 70 into the inlet plenum 17 of the heat exchanger 16.

A check valve 49 is installed on the wet well gas supply pipe 48. The check valve 49 checks reverse flow in the wet well gas supply pipe 48 from the dry well 40 to the wet well gas phase 70. The check valve 49 is optional and may be omitted when the isolation valve 20*a* is installed.

Figure 3:
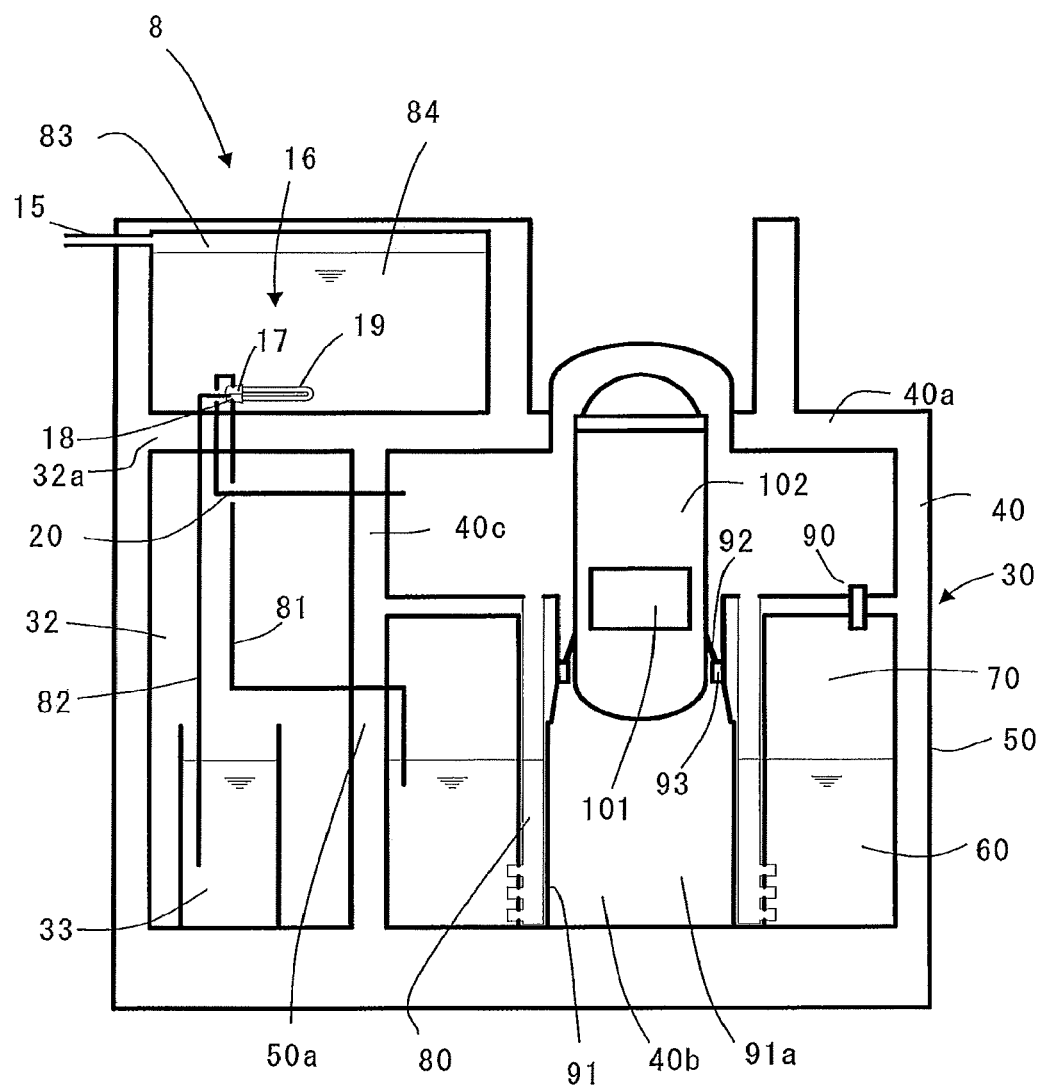
FIG. 3 is an explanatory drawing showing a total structure of another example of an advanced containment cooling system of an emergency core cooling system according to the present invention.

Although both the dry well gas supply pipe 20 and the wet well gas supply pipe 48 are installed in FIG. 2, alternatively, only one of them may be installed (See FIG. 3).

One end of the condensate return pipe 81 is connected to lower part of the outlet plenum 18 of the heat exchanger 16, and the other end of condensate return pipe 81 is opened in the containment vessel 30. The condensate return pipe 81 extends in the outer well 32. The condensate return pipe 81 returns condensate in the outlet plenum 18 back to the containment vessel 30. Although the condensate return pipe 81 returns condensate into the wet well 50 in the illustrated example, alternatively, the condensate return pipe 81 may return the condensate into the dry well 40.

Figure 15:
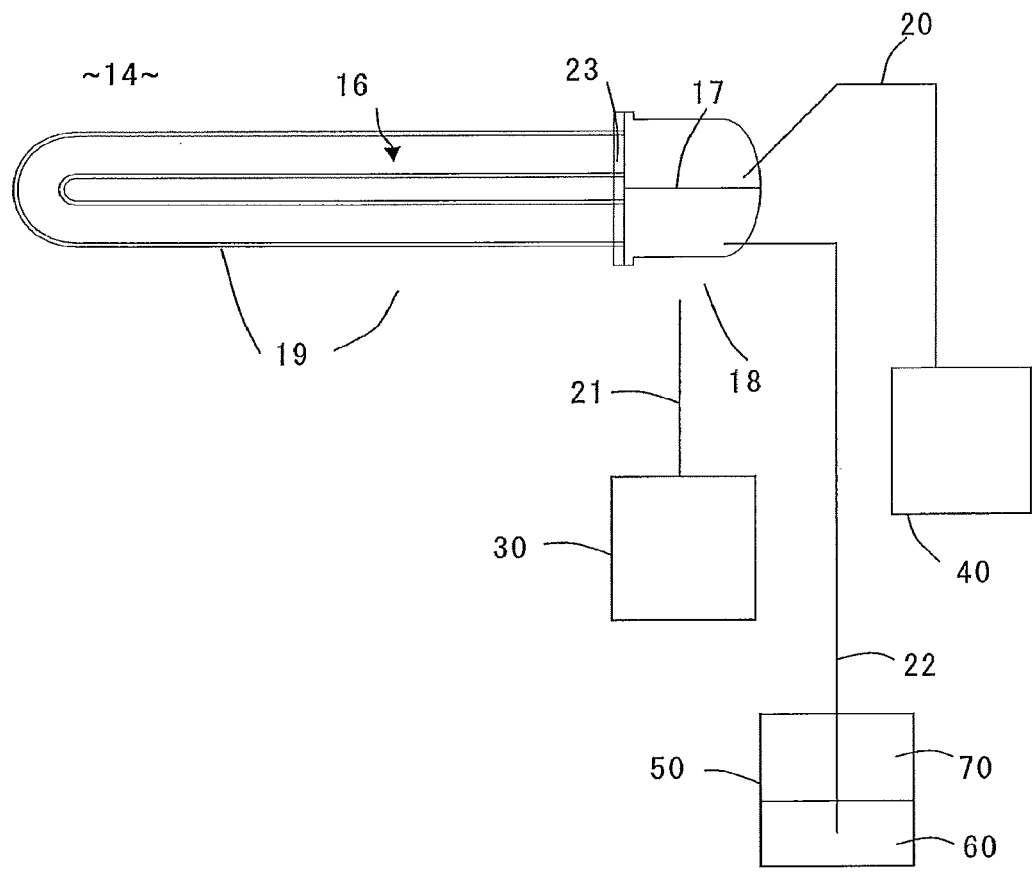
FIG. 15 is an explanatory drawing showing a basic structure of a conventional containment vessel cooling system.

The structures of the heat exchanger 16, the inlet plenum 17, the outlet plenum 18 and the heat transfer tubes 19 are the same as those of the conventional passive containment cooling system shown in FIG. 15.

<Explanation Relating to FIG. 3>

Now, a modified example of an advanced passive containment cooling system (APCCS) 8 which is used in the first embodiment is described referring to FIG. 3. In the example shown in FIG. 3, the dry well gas supply pipe 20 is installed, but the isolation valve 20*a* (FIG. 2) is not installed. Neither the wet well gas supply pipe 48 nor the check valve 49 (FIG. 2) are installed. In this example, the gases in the wet well gas phase 70 flow into the dry well 40 through the vacuum breaker valves 90, and flow into the inlet plenum 17 of the heat exchanger 16 together with the gases in the dry well 40 through the dry well gas supply pipe 20.

In a loss of coolant accident, when an active safety system injects water into the reactor, the containment vessel 30 can be cooled (See FIG. 4) by the advanced passive containment vessel cooling system 8 shown in FIG. 2 or 3. Even if nitrogen flows into the heat exchanger 16, the nitrogen can be vented out to the outer well 32 by the differential pressure between the heat exchanger 16 and the outer well 32. Thus, even if the pool water in the suppression pool 60 boils, the steam generated in the suppression pool 60 is guided to the heat exchanger 16 and is condensed therein.

In the structure shown in FIG. 2, the steam in the wet well gas phase 70 is guided to the heat exchanger 16 via the wet well gas supply pipe 48. In the structure shown in FIG. 3, the steam in the wet well gas phase 70 flows into the dry well 40 via the vacuum breaker valves 90, and then, to the heat exchanger 16 via the dry well gas supply pipe 20.

In both cases, nitrogen flown into the heat exchanger 16 with steam is vented to the outer well 32 via the gas vent pipe 82. Thus, the advanced passive containment cooling system 8 can continuously condense the steam in the containment vessel 30 and cool the containment vessel 30. Thus, in the advanced passive containment cooling system 8, the tip of the gas vent pipe 82 is submerged in the water in the scrubbing pool 33, and the nitrogen can be vented in the outer well 32.

Figure 4:
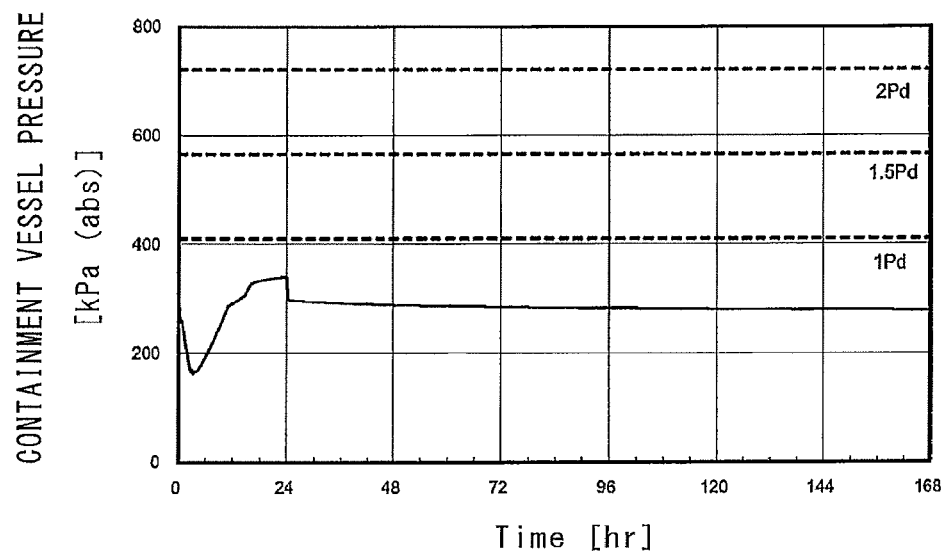
FIG. 4 is a graph showing an example of estimation of pressure in the containment vessel in a loss of coolant accident with an advanced passive containment cooling system according to the present invention.

<Explanation Relating to FIG. 4>

Now, referring to FIG. 4, calculated results of the pressure in the containment vessel 30 in a loss of coolant accident is explained. In this case, the containment vessel 30 is cooled using the advanced passive containment cooling system 8 while water injection in the reactor is continued by active safety systems. The plant is an ABWR of 1350 MWe power output class. In a loss of coolant accident, the containment vessel 30 is cooled using the advanced passive containment cooling system 8 while water is injected into the reactor by the air-cooled injection system 6. The capacity of the air-cooled injection system 6 is assumed to be the same as the capacity of the low pressure flooder system 2.

The result of FIG. 4 shows that the pressure in the containment vessel 30 is sufficiently lower than the design pressure Pd, and the containment vessel 30 is sufficiently cooled by the advanced passive containment cooling system 8. That is, the advanced passive containment cooling system 8 functions as a residual heat removal system in a loss of coolant accident of a reactor which uses an active safety system. The decay heat of the core 101 is transferred to the pool water in the suppression pool 60 by the injected water of the air-cooled injection system 6 and the break flow, and the generated steam is condensed by the advanced passive containment cooling system 8. Thus, the containment vessel 30 is cooled by the advanced passive containment cooling system 8.

The core 101 is cooled by the air-cooled injection system 6, and the decay heat of the core 101 is ultimately removed by the advanced passive containment cooling system 8. Therefore, even if the containment vessel 30 is not cooled by the residual heat removal system 3, integrity of the core 101 and the containment vessel 30 is secured by the air-cooled injection system 6 and the advanced passive containment cooling system 8 in a loss of coolant accident.

The major difference between the first embodiment and the prior art is that, in the first embodiment, the number of the residual heat removal systems 3 is reduced to the minimum of two while the number of the active safety divisions is three. As a result, the number of the reactor coolant water systems and the number of the reactor sea water systems both are reduced to the minimum of two. On the other hand, the containment vessel 30 is cooled by the advanced passive containment cooling system 8 in a loss of coolant accident, so that the reliability of cooling of the containment vessel 30 is much improved compared with the hybrid safety system (FIG. 12) which uses conventional passive containment cooling system 12.

Figure 16:
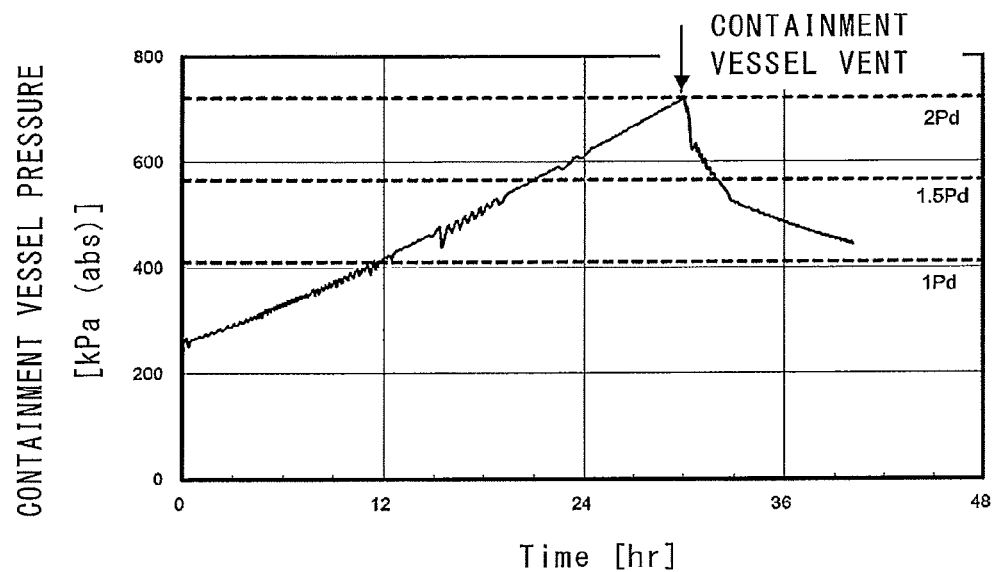
FIG. 16 is a graph showing an example of estimation of pressure in the containment vessel in a loss of coolant accident with a conventional passive containment cooling system.
Figure 17:
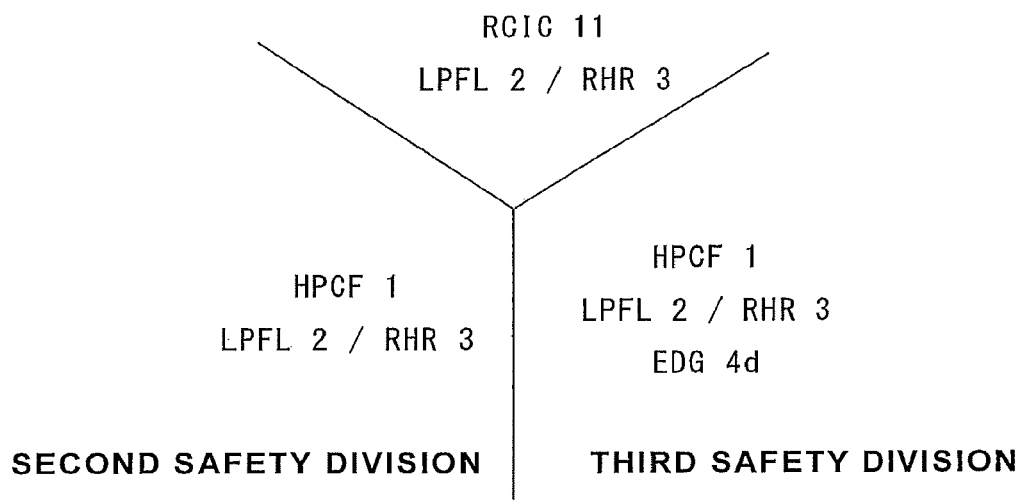
FIG. 17 is an explanatory drawing showing a total structure of an emergency core cooling system of a conventional ABWR.
Figure 18:
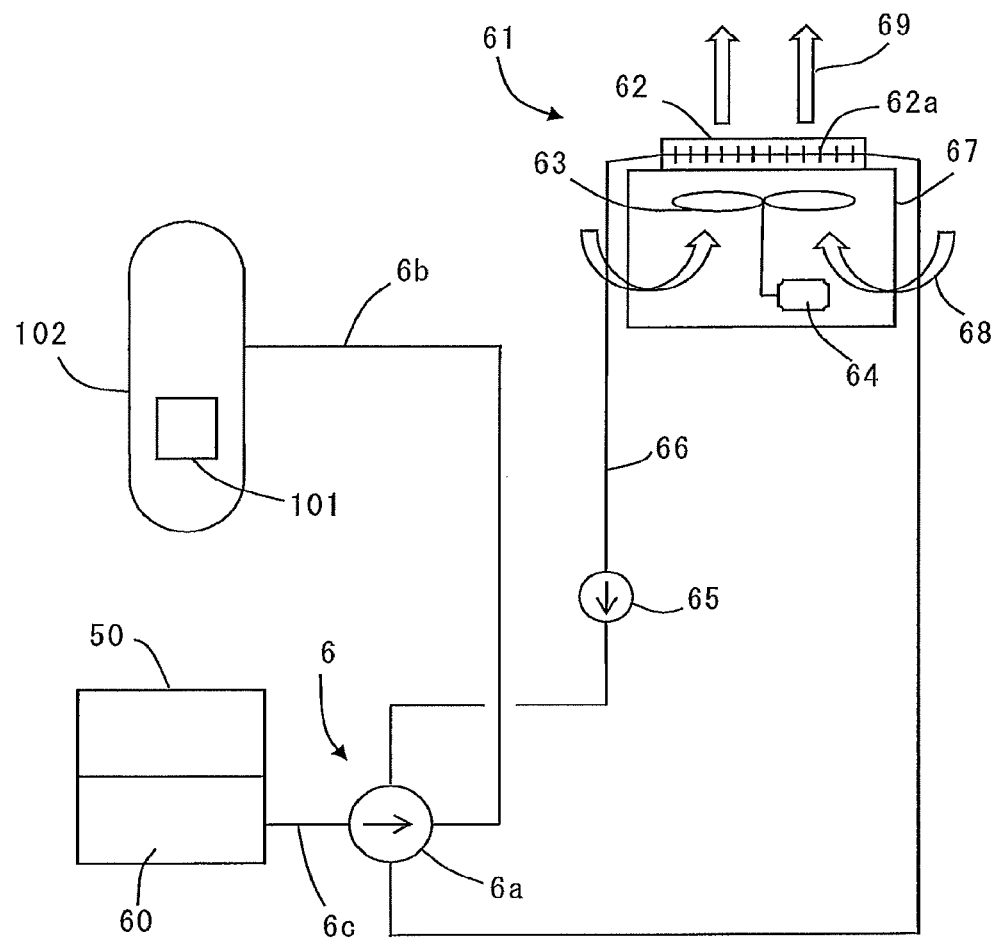
FIG. 18 is an explanatory drawing showing a basic structure of a conventional air-cooled core cooling system.

For example, in the hybrid safety system (FIG. 12), even if the conventional passive containment system 12 is used together with the emergency core cooling system of the active safety systems in a loss of coolant accident, the containment vessel 30 cannot be cooled (See FIG. 16). Therefore, in order to satisfy the N−2 safety criterion which takes into a single failure and an on-line maintenance, three residual heat removal systems 3, three reactor coolant water systems, and three sea water systems are required. Since each of the reactor coolant water systems and the sea water systems installs active components redundantly, fifteen pumps are needed in total. However, there is a risk of losing the entire function of the three systems due to common cause failures. Specifically, there is a risk of entire loss of function of all of the systems at the same time caused by a giant earthquake or a large tsunami, because the sea water is used as the ultimate heat sink.

On the contrary, in the first embodiment, as for function of the residual heat removal, even a single failure in the residual heat removal system 3 in the first safety division and an on-line maintenance in the residual heat removal system 3 in the second safety division are considered in a loss of coolant accident, the containment vessel 30 is cooled by the advanced passive containment cooling system 8. Therefore, N−2 safety criterion can be satisfied. In addition, since the advanced passive containment cooling system 8 does not require active components or any emergency power sources, it is highly reliable. Furthermore, since the atmosphere is used for ultimate heat sink, it is extremely highly reliable against natural disaster such as a giant earthquake or a big tsunami.

As explained above, in a hybrid safety system having both a passive safety system and an active emergency core cooling system, the containment vessel can be cooled using the advanced passive containment cooling system even when an active safety system is operated. Therefore, the containment vessel can be cooled using the advanced passive containment cooling system while the core is cooled by the active safety system in a loss of coolant accident, which results in a remarkable improvement in reliability against a loss of coolant accident.

The residual heat removal systems use sea water as the ultimate heat sink, and require reactor sea water systems, which have a concern of simultaneous loss of function of the redundant systems caused by a giant earthquake or a big tsunami. In addition, the residual heat removal systems require the reactor coolant water systems as the secondary systems, and a large numbers of components.

According to the present embodiment, the number of the residual heat removal systems can be reduced to two, while cooling function of the containment vessel is improved by the advanced passive containment cooling system in a loss of coolant accident. In addition, by reduction of the number of the residual heat removal systems to two, the other motor-driven active safety systems can be changed to the air-cooled injection systems which are independent from the residual heat removal systems. The air-cooled injection systems are independent from the reactor coolant water systems, the reactor sea water systems and the emergency diesel generators. Thus, an emergency core cooling system with a limited number of sub-systems can be provided which has a remarkably high reliability against a giant earthquake, a big tsunami, a long-term SBO (station blackout) and a loss of ultimate heat sink (LUHS).

As described above, according to the present embodiments of the invention, reliability of cooling the containment vessel in a loss of coolant accident in a nuclear plant with three or more active safety divisions is improved, while reducing the number of components of residual heat removal systems, the reactor coolant water systems and the reactor sea water systems. In addition, according to the embodiments, reliability against a station blackout (SBO) and a loss ultimate heat sink (LUHS) is much improved, by adding diversity of active safety systems and emergency power sources disposed in the active safety divisions.

Second Embodiment

Figure 5:
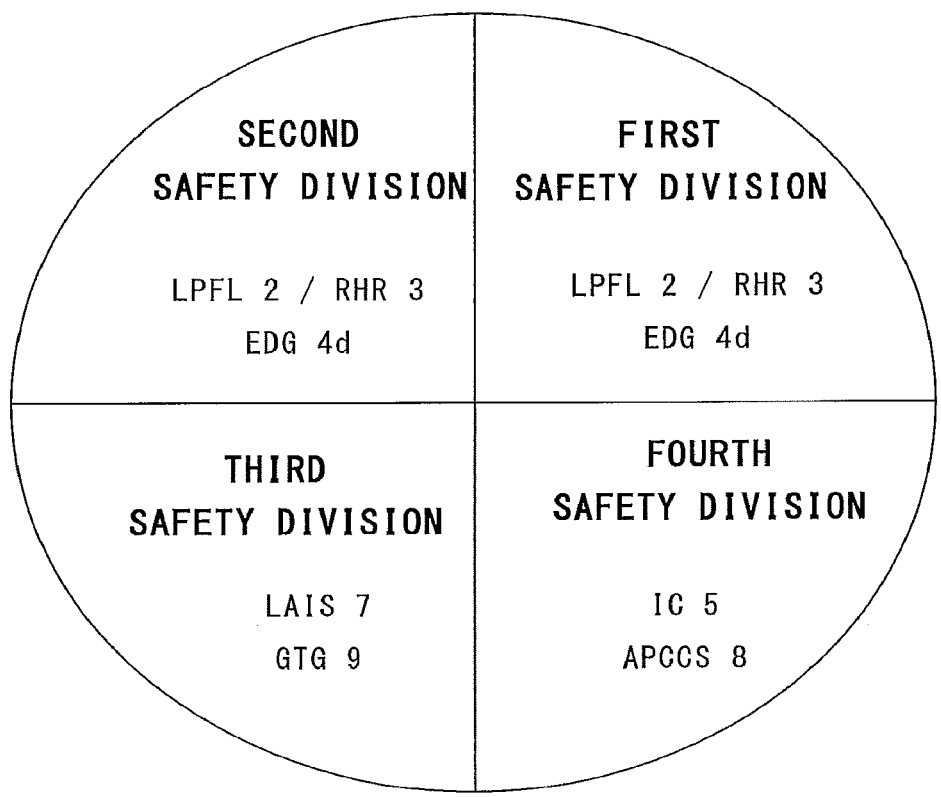
FIG. 5 is an explanatory drawing showing a total structure of a second embodiment of an emergency core cooling system according to the present invention.

Now, a second embodiment is explained referring to FIG. 5. In this embodiment, an emergency diesel generator (EDG) 4*d* as an emergency power source is provided in the first and second safety divisions each. A gas turbine generator (GTG) 9 as an emergency power source is provided in the third safety division. Furthermore, a low-pressure air-cooled injection system (LAIS) 7 is provided as only one motor-driven active safety system in the third safety division. The low-pressure air-cooled injection system 7 is a motor-driven low pressure injection system. The capacity of the low-pressure air-cooled injection system 7 is the same as that of the low pressure flooder system 2. The other features are the same as those of the first embodiment. The motor-driven pump of the low-pressure air-cooled injection system 7 is cooled by the air fin cooler 61 (See FIG. 18), and the reactor sea water system is not used for cooling it.

In the present embodiment, there is an advantage that frequency of the station blackout due to common cause failures can be suppressed because the emergency power sources are diversified in the emergency diesel generators 4*d* and the gas turbine generator 9. In addition, frequency of the total loss of active safety systems due to common cause failures can be suppressed because the active safety systems are diversified in the low pressure flooder systems 2 and the low-pressure air-cooled injection system 7.

In the present embodiment, an air-cooled diesel generator may be used instead of the gas turbine generator 9. The air-cooled diesel generator does not require a reactor sea water system.

Third Embodiment

Figure 6:
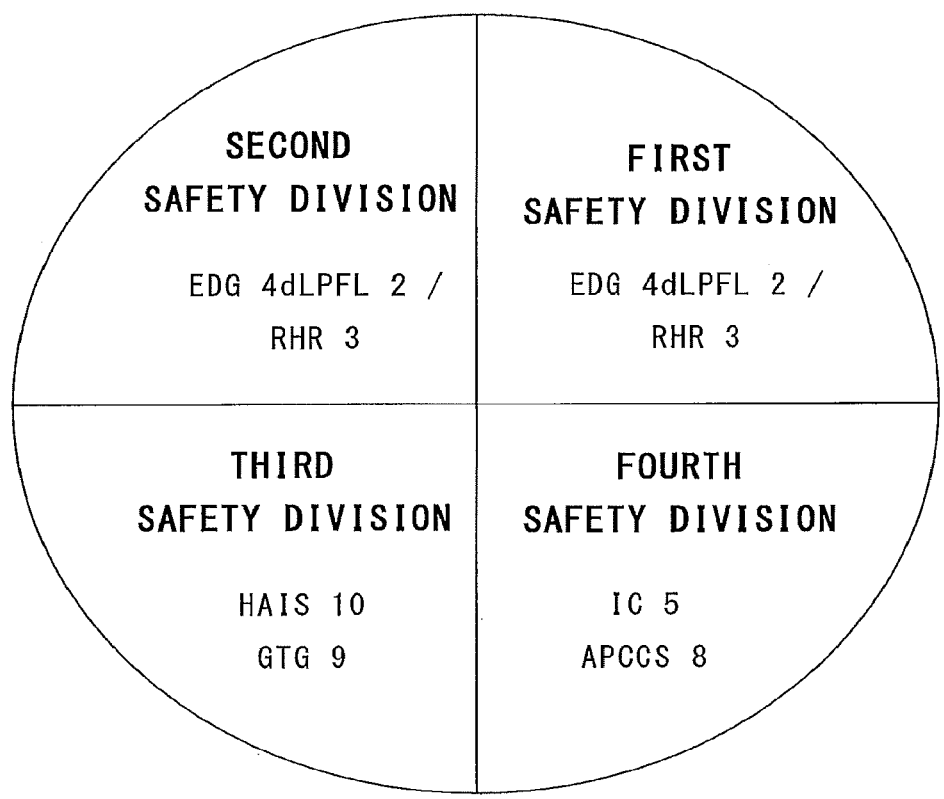
FIG. 6 is an explanatory drawing showing a total structure of a third embodiment of an emergency core cooling system according to the present invention.

Now, a third embodiment is explained referring to FIG. 6. In this embodiment, a high-pressure air-cooled injection system (HAIS) 10 is provided as only one motor-driven active safety system in the third safety division. The high-pressure air-cooled injection system 10 is a motor-driven high pressure injection system. The capacity of the high-pressure air-cooled injection system 10 is the same as that of the high pressure core flooder system (HPCF) 1. The other features are the same as those of the second embodiment. The motor-driven pump of the high-pressure air-cooled injection system 10 is cooled by the air fin cooler 61 (See FIG. 18), and the reactor sea water system is not used for cooling it.

In the present embodiment, frequency of the total loss of active safety systems due to common cause failures can be suppressed because the active safety systems are diversified in the low pressure flooder systems 2 and the high-pressure air-cooled injection system 10. In addition, the core can be cooled without depressurization of the reactor owing to the existence of the high-pressure air-cooled injection system 10. Thus, the core can be cooled without depressurization of the reactor in a loss of feed water transient or in a loss of coolant accident due to a small diameter pipe break. As a result, frequency of the core meltdown caused by failure of depressurization of the reactor can be remarkably reduced.

In the present embodiment, an air-cooled diesel generator may be used instead of the gas turbine generator (GTG) 9. The air-cooled diesel generator does not require a reactor sea water system.

Fourth Embodiment

Figure 7:
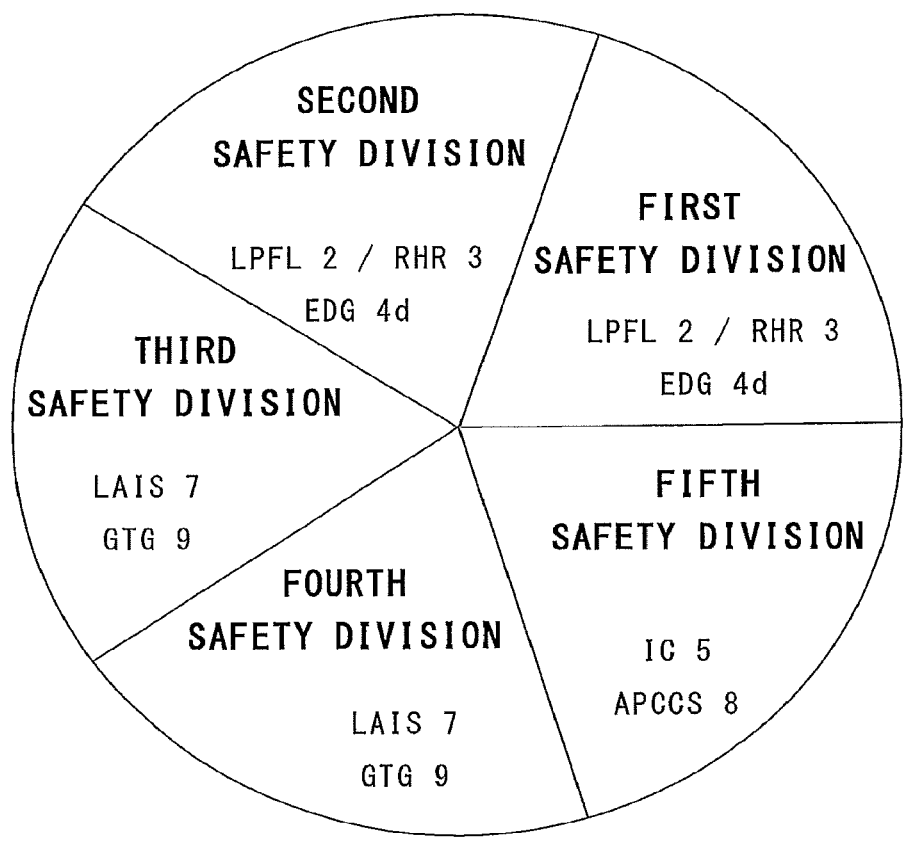
FIG. 7 is an explanatory drawing showing a total structure of a fourth embodiment of an emergency core cooling system according to the present invention.

Now, a fourth embodiment is explained referring to FIG. 7. In this embodiment, the first to fourth safety divisions are provided which are active safety divisions. In addition, a fifth safety division is provided which is a passive safety division. The structures of the first to third safety divisions of the present embodiment are the same as those of the second embodiment shown in FIG. 5. The structure of the fourth safety division is the same as that of the third safety division. The structure of the fifth safety division of the present embodiment is the same as that of the fourth safety division of the first embodiment shown in FIG. 1.

In the present embodiment, there are four safety divisions for active safety systems comprising two low pressure flooder systems (LPFLs) 2 and two low-pressure air-cooled injection systems (LAISs) 7.

Since one low-pressure air-cooled injection system 7 is added compared to the second embodiment (FIG. 5), reliability against a loss of coolant accident is improved. In addition, since the number of the gas turbine generators (GTGs) 9 is also increased, the occurrence frequency of station blackout can be decreased. Furthermore, even if a pipe break in an active safety system, a single failure and an on-line maintenance are assumed, a fourth active safety system can cool the core. That is, the emergency core cooling system of the active safety systems also satisfies the N–2 safety criterion.

The residual heat removal systems of the present embodiment in a loss of coolant accident satisfy the N–2 safety criterion as those of the first embodiment. Thus, the present embodiment satisfies the N–2 safety criterion for both safety functions in the core cooling and the residual heat removal.

In an alternative variation of the present embodiment, air-cooled DGs may be used instead of the gas turbine generators (GTGs) 9. The air-cooled DGs do not require any reactor sea water systems.

Fifth Embodiment

Figure 8:
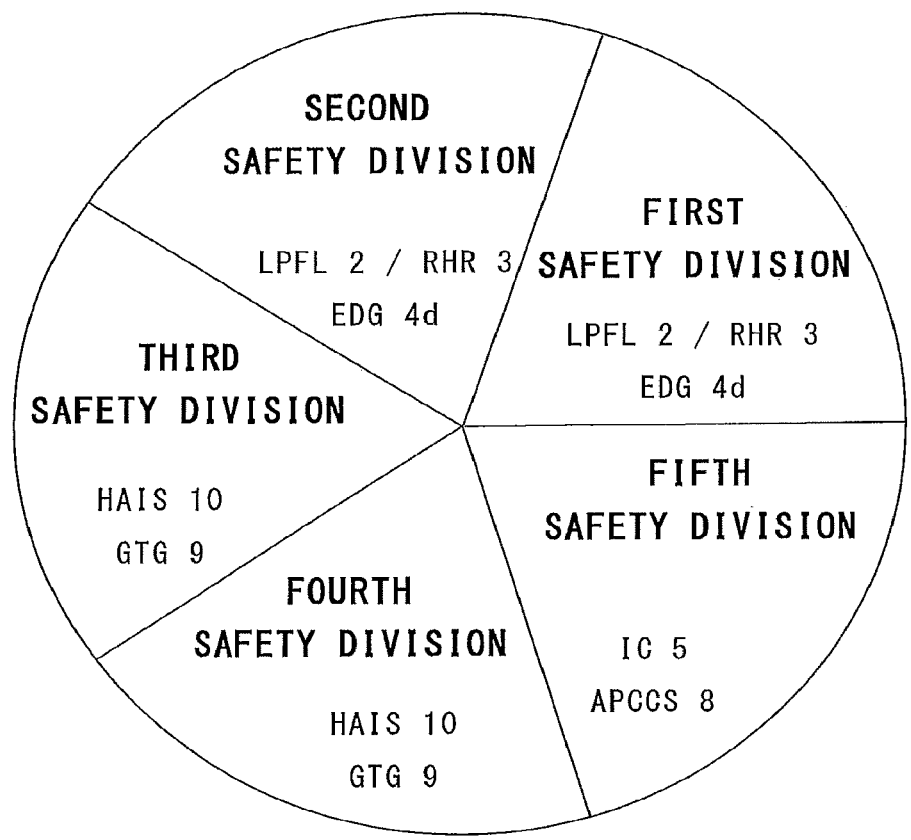
FIG. 8 is an explanatory drawing showing a total structure of a fifth embodiment of an emergency core cooling system according to the present invention.

Now, a fifth embodiment is explained referring to FIG. 8. In this embodiment, the first to fourth safety divisions are provided which are active safety divisions. In addition, a fifth safety division is provided which is a passive safety division. The structures of the first and second safety divisions of the present embodiment are the same as those of the second embodiment shown in FIG. 5. In the third and fourth safety divisions each, a high-pressure air-cooled injection system (HAIS) as the only one motor-driven active safety system and a gas turbine generator (GTG) 9 are installed. The structure of the fifth safety division of the present embodiment is the same as the fourth safety division of the first embodiment shown in FIG. 1. In the present embodiment, there are four active safety systems, and there are two low pressure flooder systems (LPFLs) 2, and two high-pressure air-cooled injection systems (HAISs) 10.

Since one high-pressure air-cooled injection system 10 is added compared to the third embodiment (FIG. 6), reliability against a loss of coolant accident is improved. In addition, since the number of the gas turbine generators (GTGs) 9 is also increased, the occurrence frequency of station blackout can be decreased. Furthermore, even if a pipe break in an active safety system, a single failure and an on-line maintenance are assumed, a fourth active safety system can cool the core. That is, the emergency core cooling system of the active safety system also satisfies the N–2 safety criterion.

The residual heat removal systems of the present embodiment in a loss of coolant accident satisfy the N–2 safety criterion as those of the first embodiment. Thus, the present embodiment satisfies the N–2 safety criterion for both safety functions in the core cooling and the residual heat removal. In addition, since two high-pressure air-cooled systems are provided, the core can be cooled with higher reliability in a loss of feed water transient or in a small diameter break loss of coolant accident. As a result, frequency of the core meltdown caused by failure of depressurization of the reactor would be remarkably reduced.

In the present embodiment, air-cooled diesel generators may be used instead of the gas turbine generators 9. The air-cooled diesel generators do not require reactor sea water systems.

Sixth Embodiment

Figure 9:
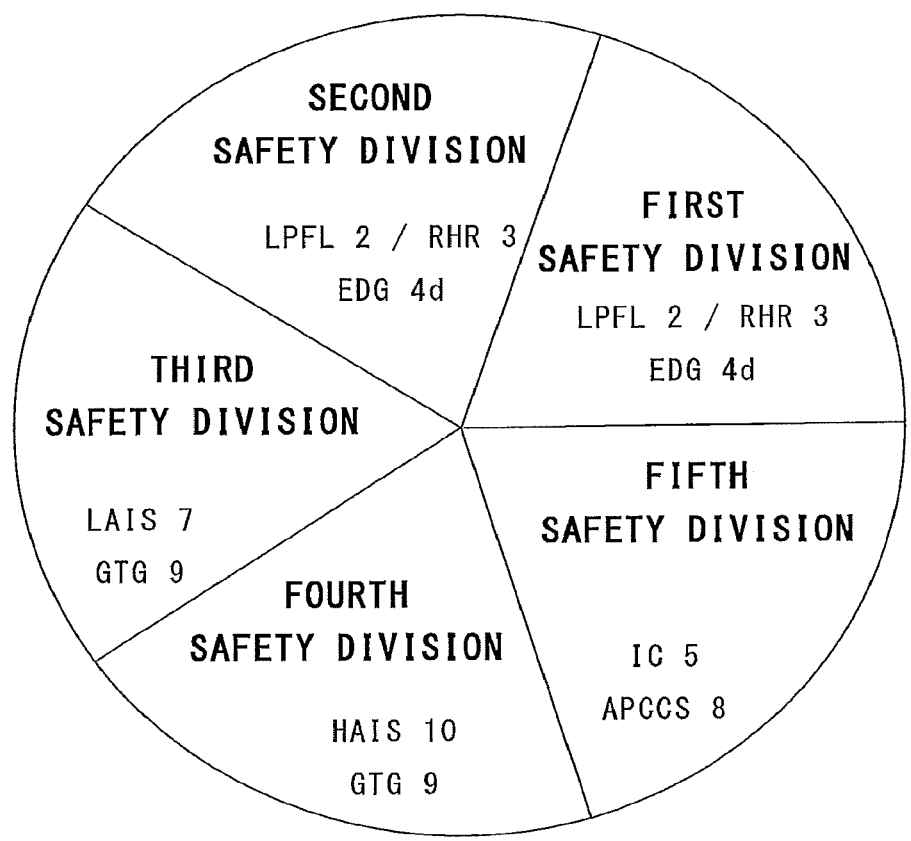
FIG. 9 is an explanatory drawing showing a total structure of a sixth embodiment of an emergency core cooling system according to the present invention.

Now, a sixth embodiment is explained referring to FIG. 9. In this embodiment, the first to fourth safety divisions are provided which are active safety divisions. In addition, a fifth safety division is provided which is a passive safety division. The structure of the first and second safety divisions of the present embodiment are the same as those of the second embodiment shown in FIG. 5. In the third safety division, a low-pressure air-cooled injection system (LAIS) 7 as the only one motor-driven active safety system and a gas turbine generator (GTG) 9 are installed. In the fourth safety division, a high-pressure air-cooled injection system (HAIS) 10 as the only one motor-driven active safety system and a gas turbine generator (GTG) 9 are installed. The structures in the third safety division and the fourth safety division may be exchanged to each other. The structure in the fifth safety division is the same as that in the fourth safety division of the first embodiment (FIG. 1).

In the present embodiment, there are four safety divisions for active safety systems comprising two low pressure flooder systems (LPFLs) 2, one low-pressure air-cooled injection system (LAIS) 7, and one high-pressure air-cooled injection system (HAIS) 10.

In the present embodiment, even if a pipe break in an active safety system, a single failure and an on-line maintenance are assumed, a fourth active safety system can cool the core. That is, the emergency core cooling system of the active safety system also satisfies the N–2 safety criterion. The residual heat removal systems of the present embodiment in a loss of coolant accident satisfy the N−2 safety criterion as those of the first embodiment. Thus, the present embodiment satisfies the N−2 safety criterion for a loss of coolant accident. In addition, since a low-pressure air-cooled injection system 7 and a high-pressure air-cooled injection system 10 are provided in the present embodiment, diversity of air-cooled injection systems is provided resulting in the improvement of reliability.

In the present embodiment, air-cooled diesel generators may be used instead of the gas turbine generators 9. The air-cooled diesel generators do not require reactor sea water systems.

Seventh Embodiment

Figure 10:
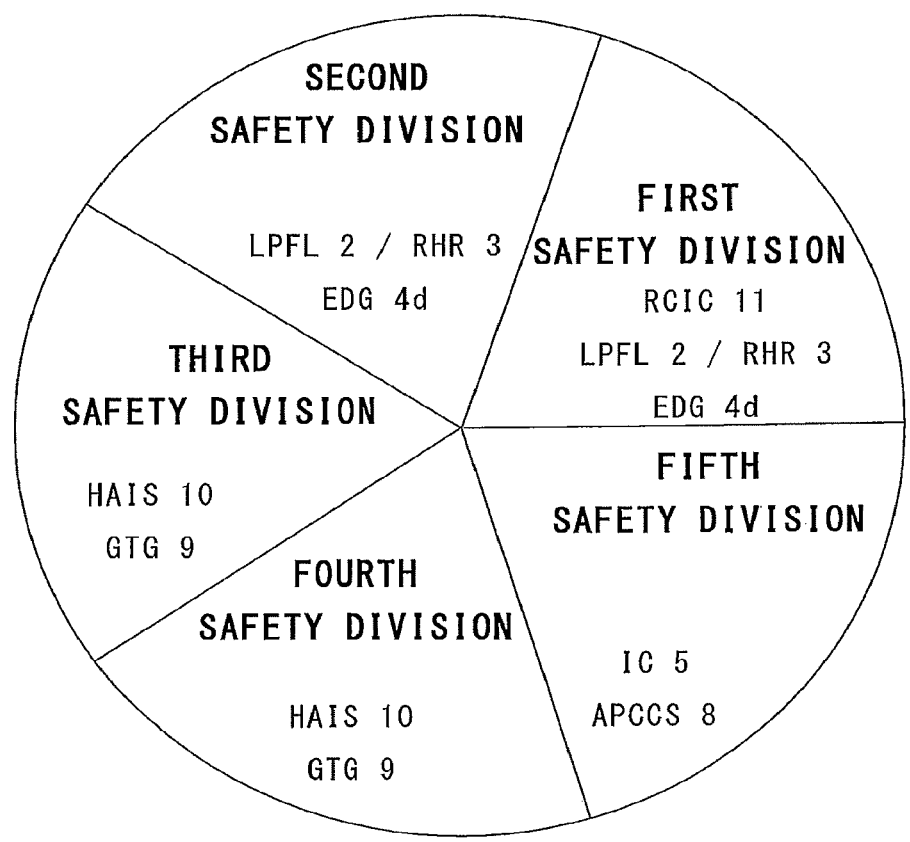
FIG. 10 is an explanatory drawing showing a total structure of a seventh embodiment of an emergency core cooling system according to the present invention.

Now, a seventh embodiment is explained referring to FIG. 10. In this embodiment, the first to fourth safety divisions are provided which are active safety divisions. In addition, a fifth safety division is provided which is a passive safety division. The features described above are the same as those of the sixth embodiment (FIG. 9). The present embodiment is different from the sixth embodiment in that it has a reactor core isolation cooling system (RCIC) 11, which is driven by a steam turbine, in the first safety division, for example. The reactor core isolation cooling system 11 is a high pressure injection system that injects water into the reactor pressure vessel at a high pressure condition.

In the present embodiment, there are five active safety systems comprising two low pressure flooder systems (LP-FLs) 2, two high-pressure air-cooled injection systems (HAISs) 10, and one reactor core isolation cooling system (RCIC) 11. Since a high pressure injection system is added in the present embodiment compared with the sixth embodiment, reliability of cooling the core without depressurization is improved. Therefore, reliability of cooling the core is improved without depressurization in a loss of feed water transient or in a loss of coolant accident caused by a small diameter pipe break. In addition, the core can be kept flooded in a loss of coolant accident, since three high pressure core cooling systems are provided, which is the same configuration as an ABWR. Alternatively, the reactor core isolation cooling system (RCIC) 11 may be disposed in any other active safety divisions.

In the present embodiment, air-cooled diesel generators may be used instead of the gas turbine generators 9. The air-cooled diesel generators do not require reactor sea water systems.

Eighth Embodiment

Figure 11:
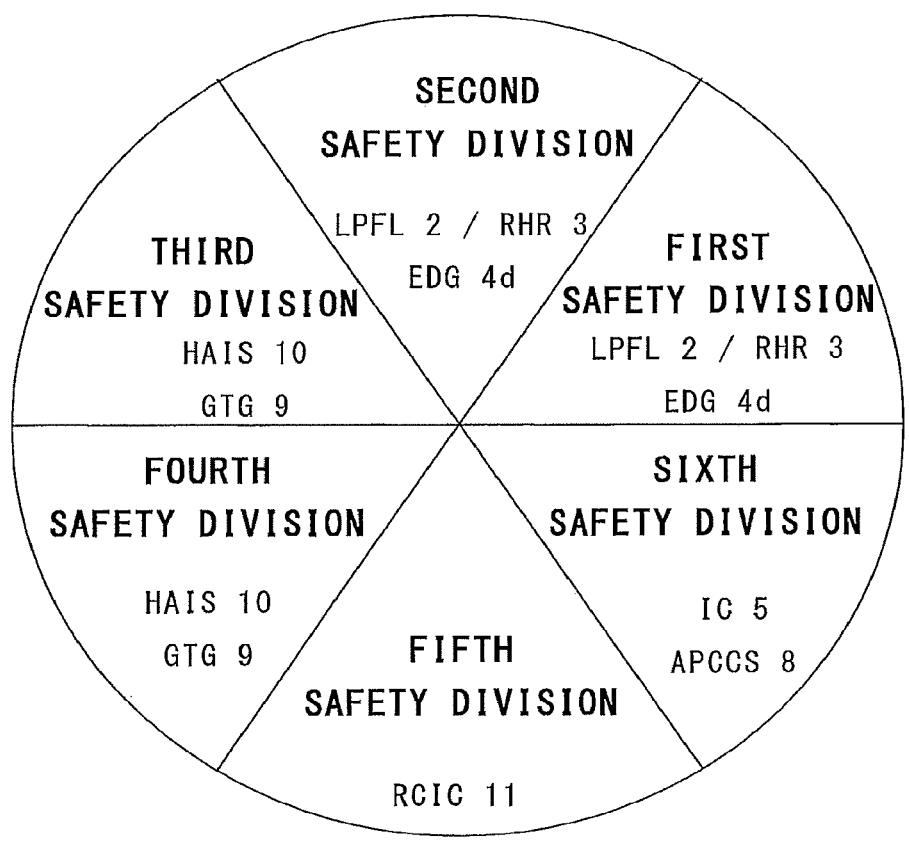
FIG. 11 is an explanatory drawing showing a total structure of an eighth embodiment of an emergency core cooling system according to the present invention.
Figure 12:
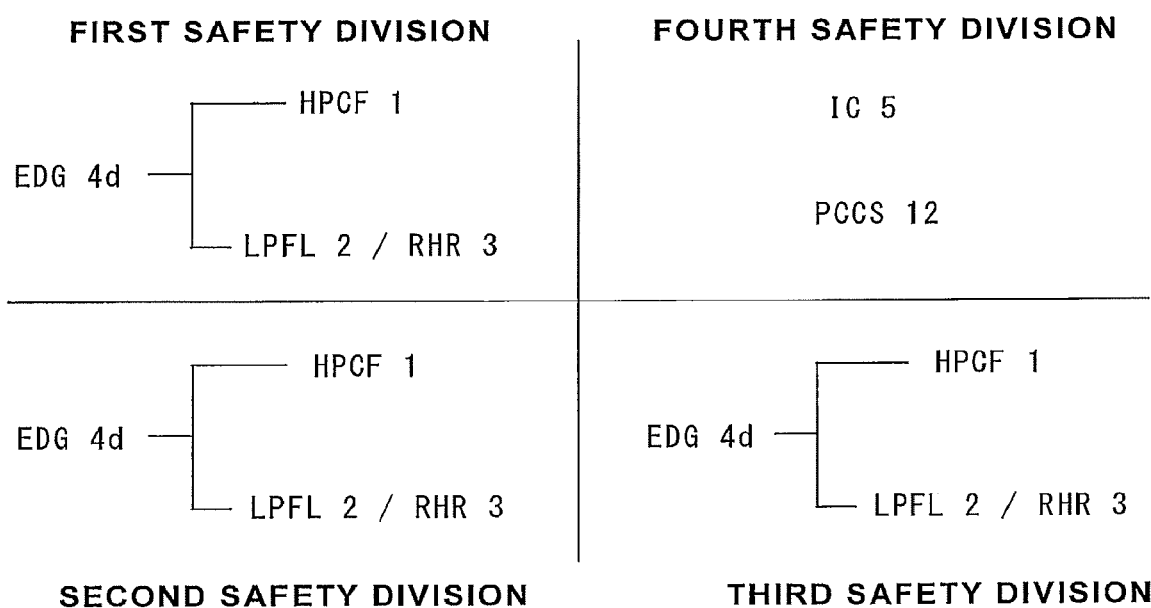
FIG. 12 is an explanatory drawing showing a total structure of an emergency core cooling system of a conventional hybrid safety system.
Figure 13:
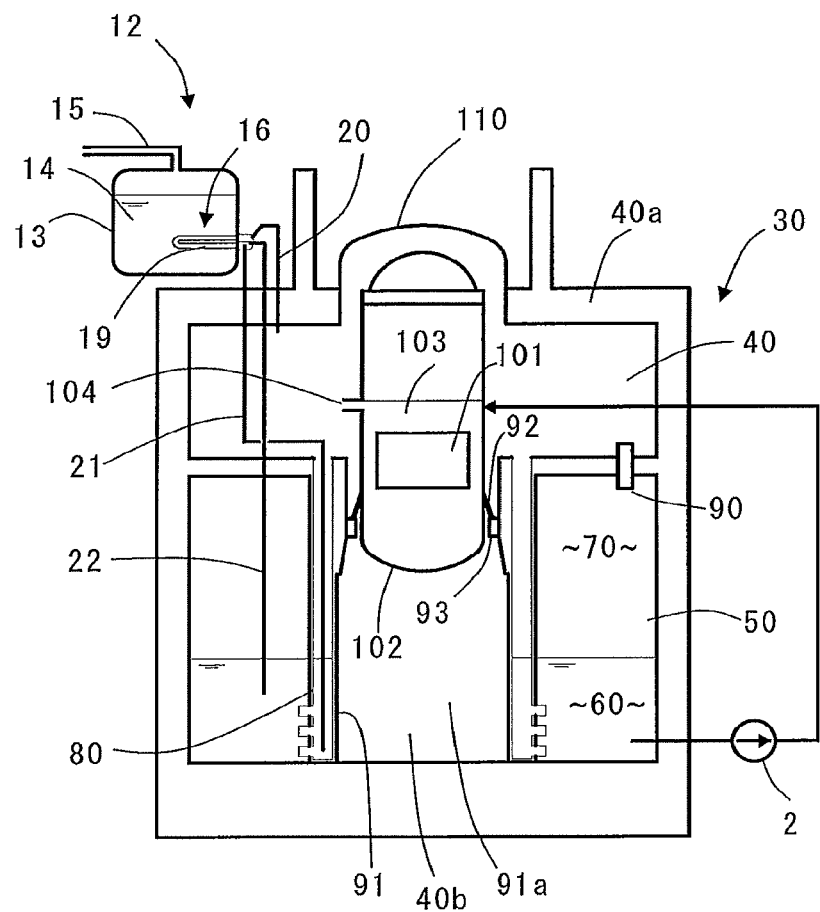
FIG. 13 is an explanatory drawing showing a total structure of a conventional passive containment cooling system and the containment vessel.
Figure 14:
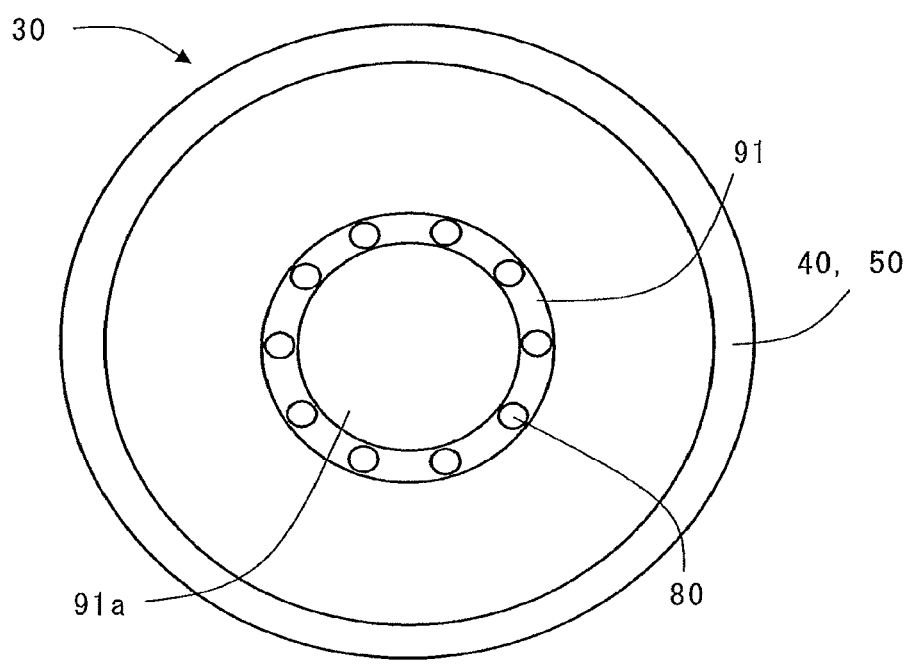
FIG. 14 is a plan view showing a total structure of a conventional containment vessel.

Now, an eighth embodiment is explained referring to FIG. 11. In this embodiment, the first to fifth safety divisions are provided which are active safety divisions. In addition, a sixth safety division is provided which is a passive safety division. The structures of the first and second safety divisions of the present embodiment are the same as those of the second embodiment (FIG. 5). The third and fourth safety divisions each have a high-pressure air-cooled injection system 10 as the only one motor-driven active safety system and a gas turbine generator 9. In the fifth safety division, there is disposed a reactor isolation cooling system 11, which is driven by a steam turbine.

The present embodiment is different from the seventh embodiment (FIG. 10) in that the fifth safety division is only for the reactor isolation cooling system 11. As a result, it can be avoided that the reactor isolation cooling system 11 loses its function at the same time when the low pressure flooder system 2/the residual heat removal system 3 lose functions due to a fire or a flooding. As a result, reliability of the hybrid safety system is further improved.

In the present embodiment, air-cooled diesel generators may be used instead of the gas turbine generators 9. The air-cooled diesel generators do not require reactor sea water systems.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATION OF THE REFERENCE NUMERALS

1: high pressure core flooder system (HPCF); 2: low pressure flooder system (LPFL); 3: residual heat removal system (RHR); 4: emergency power source (EPS); 4d: emergency diesel generator (EDG); 5: isolation condenser (IC); 6: air-cooled injection system (AIS); 6a: motor-driven pump; 6b: injection pipe; 6c: suction pipe; 7: low-pressure air-cooled injection system (LAIS); 8: advanced passive containment cooling system (APCCS); 10: high-pressure air-cooled injection system (HAIS); 11: reactor core isolation cooling system (RCIC); 12: passive containment cooling system (PCCS); 13: cooling water pool; 14: cooling water; 15: exhaust pipe; 16: heat exchanger; 17: inlet plenum; 18: outlet plenum; 19: heat transfer tube; 20: dry well gas supply pipe (gas supply pipe); 20a: isolation valve; 21: condensate return pipe; 22: gas vent pipe; 23: tube plate; 30: containment vessel; 32: outer well; 32a: top slab; 33: scrubbing pool; 40: dry well; 40b: lower dry well; 40c: dry well common wall; 48: wet well gas supply pipe (gas supply pipe); 49: check valve; 50: wet well; 50a: wet well common wall; 60: suppression pool; 61: air fin cooler (AFC); 62: tube bundle; 62a: cooling tube; 63: fan; 64: electric motor; 65: pump; 66: circulation pipe; 67: support structure; 68: external air; 70: wet well gas phase; 80: LOCA vent pipe; 81: condensate return pipe; 82: gas vent pipe; 83: APCCS pool; 84: pool water; 90: vacuum breaker valves; 91: pedestal; 91a: pedestal cavity; 92: RPV skirt; 93: RPV support; 101: core; 102: reactor pressure vessel (RPV); 103: cooling water; 104: break opening; 110: containment vessel lid

What is claimed is:
1. An emergency core cooling system for a boiling water reactor plant, the plant including:
a reactor pressure vessel containing a core
a containment vessel having:
a dry well containing the reactor pressure vessel,
a wet well containing a suppression pool in a lower part thereof, and a wet well gas phase in an upper part thereof,
a LOCA vent pipe connecting the dry well and the suppression pool, an outer well disposed outside of the dry well and the wet well, adjacent to the dry well via a dry well common wall, and adjacent to the wet well via a wet well common wall, and a scrubbing pool storing water, disposed in the outer well, the emergency core cooling system comprising:

at least three active safety divisions each including only one motor-driven active safety system;

at least one passive safety division each including a passive safety system;

an emergency power source disposed in each of the active safety divisions to supply electric power to the motor-driven active safety system; and the passive safety system including at least an advanced passive containment cooling system disposed in the passive safety division, wherein only two active safety divisions out of the at least three active safety divisions each includes a low pressure flooder system that is also used as a residual heat removal system as the only one motor-driven active safety system, the active safety divisions except for the only two active safety divisions, each of which includes the low pressure flooder system that is also used as the residual heat removal system, includes an air-cooled injection system as the only one motor-driven active safety system, the air-cooled injection system includes:
a motor-driven pump;
a suction pipe providing water from the suppression pool to the motor-driven pump;
an injection pipe configured to inject water from the motor-driven pump into the reactor pressure vessel;
an air fin cooler having a fan and a tube bundle of cooling tubes, the fan being configured to blow external air to the tube bundle;
cooling water flowing in the cooling tubes;
a circulation pump to circulate the cooling water;
a circulation pipe configured to circulate the cooling water between the motor-driven pump and the air fin cooler to cool the motor-driven pump, and the advanced passive containment cooling system being configured to be able to cool the containment vessel and satisfy N−2 safety criterion when a loss of coolant accident has occurred and the air-cooled injection system is activated considering a single failure for one of the residual heat removal system and on-line maintenance for the other residual heat removal system, the advanced passive containment cooling system includes:
a cooling pool storing water, the cooling pool being disposed outside the containment vessel;
a heat exchanger including an inlet plenum, an outlet plenum and heat transfer tubes, at least part of the heat exchanger being submerged in the water in the cooling pool;
a gas supply pipe connected to the inlet plenum of the heat exchanger at one end and to a gas phase part of the containment vessel at another end, the gas supply pipe being configured to guide gases in the containment vessel into the heat exchanger;
a condensate return pipe connected to the outlet plenum of the heat exchanger at one end and to the containment vessel at another end, the condensate return pipe being configured to guide condensate in the heat exchanger into the containment vessel; and
a gas vent pipe connected to the outlet plenum of the heat exchanger at one end and submerged in the scrubbing pool in the outer well at another end, the gas vent pipe being configured to vent non-condensable gases in the heat exchanger into the outer well.

2. The emergency core cooling system according to claim 1, wherein
the at least three active safety divisions include only three active safety divisions,
only two active safety divisions out of the three active safety divisions each includes the low pressure flooder system that is also used as the residual heat removal system as the only one motor-driven active safety system and a diesel generator, and
only one active safety division other than the only two active safety divisions out of the three active safety divisions includes the air-cooled injection system as the only one motor-driven active safety system and a gas turbine generator, the air-cooled injection system being a motor-driven low pressure injection system.

3. The emergency core cooling system according to claim 1, wherein
the at least three active safety divisions includes only three active safety divisions,
only two active safety divisions out of the three active safety divisions each includes the low pressure flooder system that is also used as the residual heat removal system as the only one motor-driven active safety system and a diesel generator, and
only one active safety division other than the only two active safety divisions out of the three active safety divisions includes the air-cooled injection system as the only one motor-driven active safety system and a gas turbine generator, the air-cooled injection system being a motor-driven high pressure injection system.

4. The emergency core cooling system according to claim 1, wherein
the at least three active safety divisions include only four active safety divisions,
only two active safety divisions out of the four active safety divisions each includes the low pressure flooder system that is also used as the residual heat removal system as the only one motor-driven active safety system and a diesel generator, and
other two active safety divisions out of the four active safety divisions each includes the air-cooled injection system as the only one motor-driven active safety system and a gas turbine generator, the air-cooled injection system being a motor-driven low pressure injection system.

5. The emergency core cooling system according to claim 1, wherein
the at least three active safety divisions include only four active safety divisions,
only two active safety divisions out of the four active safety divisions each includes the low pressure flooder system that is also used as the residual heat removal system as the only one motor-driven active safety system and a diesel generator, and
other two active safety divisions out of the four active safety divisions each includes the air-cooled injection system as the only one motor-driven active safety system and a gas turbine generator, the air-cooled injection system being a motor-driven high pressure injection system.

6. The emergency core cooling system according to claim 1, wherein the at least three active safety divisions include only four active safety divisions, only two active safety divisions out of the four active safety divisions each includes the low pressure flooder system that is also used as the residual heat removal system as the only one motor-driven active safety system and a diesel generator, another active safety division out of the four active safety divisions includes the air-cooled injection system as the only one motor-driven active safety system and a gas turbine generator, the air-cooled injection system being a motor-driven low pressure injection system, and yet another active safety division out of the four active safety divisions includes the air-cooled injection system as the only one motor-driven active safety system and a gas turbine generator, the air-cooled injection system being a motor-driven high pressure injection system.

7. The emergency core cooling system according to claim 1, wherein the at least three active safety divisions include only four active safety divisions, only two active safety divisions out of the four active safety divisions each includes the low pressure flooder system that is also used as the residual heat removal system as the only one motor-driven active safety system and a diesel generator, other two active safety divisions out of the four active safety divisions each includes the air-cooled injection system as the only one motor-driven active safety system and a gas turbine generator, the air-cooled injection system being a motor-driven high pressure injection system, and at least one of the four active safety divisions each includes a reactor core isolation cooling system driven by a steam turbine using main steam supplied from the reactor pressure vessel, in addition to the only one motor-driven active safety system.

8. The emergency core cooling system according to claim 1, wherein the at least three active safety divisions include only five active safety divisions, only two active safety divisions out of the five active safety divisions each includes the low pressure flooder system that is also used as the residual heat removal system as the only one motor-driven active safety system and a diesel generator, other two active safety divisions out of the five active safety divisions each includes the air-cooled injection system as the only one motor-driven active safety system and a gas turbine generator, the air-cooled injection system being a motor-driven high pressure injection system, and other one active safety division out of the five active safety divisions includes a reactor core isolation cooling system driven by a steam turbine using main steam supplied from the reactor pressure vessel.

9. The emergency core cooling system according to claim 1, wherein the at least one passive safety division each includes an isolation condenser in addition to the advanced passive containment cooling system.

10. A boiling water reactor plant comprising:

a core;

a reactor pressure vessel containing the core;

a containment vessel having:

a dry well containing the reactor pressure vessel, a wet well containing a suppression pool in a lower part thereof, and a wet well gas phase in an upper part thereof, a LOCA vent pipe connecting the dry well and the suppression pool, an outer well disposed outside of the dry well and the wet well, adjacent to the dry well via a dry well common wall, and adjacent to the wet well via a wet well common wall, and a scrubbing pool storing water, disposed in the outer well; and an emergency core cooling system including:

at least three active safety divisions each including only one motor-driven active safety system;

at least one passive safety division each including a passive safety system;

an emergency power source disposed in each of the active safety divisions to supply electric power to the motor-driven active safety system; and the passive safety system including at least an advanced passive containment cooling system disposed in the passive safety division, wherein only two active safety divisions out of the at least three active safety divisions each includes a low pressure flooder system that is also used as a residual heat removal system as the only one motor-driven active safety system, the active safety divisions except for the only two active safety divisions, each of which includes the low pressure flooder system that is also used as the residual heat removal system, each includes an air-cooled injection system as the only one motor-driven active safety system, the air-cooled injection system includes:

a motor-driven pump;

a suction pipe providing water from the suppression pool to the motor-driven pump;

an injection pipe configured to inject water from the motor-driven pump into the reactor pressure vessel;

an air fin cooler having a fan and a tube bundle of cooling tubes, the fan being configured to blow external air to the tube bundle;

cooling water flowing in the cooling tubes;

a circulation pump to circulate the cooling water;

a circulation pipe configured to circulate the cooling water between the motor-driven pump and the air fin cooler to cool the motor-driven pump, and the advanced passive containment cooling system being configured to be able to cool the containment vessel and satisfy N−2 safety criterion when a loss of coolant accident has occurred and the air-cooled injection system is activated considering a single failure for one of the residual heat removal system and on-line maintenance for the other residual heat removal system, the advanced passive containment cooling system includes:

a cooling pool storing water, the cooling pool being disposed outside the containment vessel;

a heat exchanger including an inlet plenum, an outlet plenum and heat transfer tubes, at least part of the heat exchanger being submerged in the water in the cooling pool;

a gas supply pipe connected to the inlet plenum of the heat exchanger at one end and to a gas phase part of the containment vessel at another end, the gas supply pipe being configured to guide gases in the containment vessel into the heat exchanger;

a condensate return pipe connected to the outlet plenum of the heat exchanger at one end and to the containment vessel at another end, the condensate return pipe being configured to guide condensate in the heat exchanger into the containment vessel; and a gas vent pipe connected to the outlet plenum of the heat exchanger at one end and submerged in the scrubbing pool in the outer well at another end, the gas vent pipe being configured to vent non-condensable gas in the heat exchanger into the outer well.

* * * * *